(12) United States Patent
Wang et al.

(10) Patent No.: US 10,372,970 B2
(45) Date of Patent: Aug. 6, 2019

(54) AUTOMATIC SCENE CALIBRATION METHOD FOR VIDEO ANALYTICS

(71) Applicant: QUALCOMM Incorporated, San Diego, CA (US)

(72) Inventors: Lei Wang, Clovis, CA (US); Dashan Gao, San Diego, CA (US); Lei Ma, San Diego, CA (US); Chinchuan Chiu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 15/266,747

(22) Filed: Sep. 15, 2016

(65) Prior Publication Data

US 2018/0075593 A1    Mar. 15, 2018

(51) Int. Cl.
     *G06T 7/00*      (2017.01)
     *G06K 9/00*      (2006.01)
     *H04N 13/261*      (2018.01)
     *G06T 7/80*      (2017.01)
     *G06T 7/70*      (2017.01)
     (Continued)

(52) U.S. Cl.
CPC ..... *G06K 9/00248* (2013.01); *G06K 9/00281* (2013.01); *G06K 9/00369* (2013.01); *G06K 9/00718* (2013.01); *G06K 9/00771* (2013.01); *G06T 7/246* (2017.01); *G06T 7/70* (2017.01); *G06T 7/73* (2017.01); *G06T 7/80* (2017.01); *G06T 7/85* (2017.01); *H04N 13/261* (2018.05); *G06T 2207/30196* (2013.01); *G06T 2207/30201* (2013.01); *G06T 2207/30232* (2013.01); *G06T 2207/30244* (2013.01)

(58) Field of Classification Search
CPC ......... G06K 9/00248; G06T 7/80; G06T 7/70; H04N 13/261

USPC .......................................................... 348/46
See application file for complete search history.

(56) References Cited

U.S. PATENT DOCUMENTS

| 8,059,154 | B1 | 11/2011 | Kiro et al. |
| 2006/0215031 | A1 | 9/2006 | Krahnstoever et al. |

(Continued)

FOREIGN PATENT DOCUMENTS

CN      102075736 A      5/2011

OTHER PUBLICATIONS

International Search Report and Written Opinion—PCT/US2017/044304—ISA/EPO—dated Oct. 25, 2017.

(Continued)

*Primary Examiner* — Nguyen T Truong
(74) *Attorney, Agent, or Firm* — Polsinelli LLP

(57) ABSTRACT

To determine real-world information about objects moving in a scene, the camera capturing the scene is typically calibrated to the scene. Automatic scene calibration can be accomplished using people that are found moving about in the scene. During a calibration period, a video content analysis system processing video frames from a camera can identify blobs that are associated with people. Using an estimated height of a typical person, the video content analysis system can use the location of the person's head and feet to determine a mapping between the person's location in the 2-D video frame and the person's location in the 3-D real world. This mapping can be used to determine a cost for estimated extrinsic parameters for the camera. Using a hierarchical global estimation mechanism, the video content analysis system can determine the estimated extrinsic parameters with the lowest cost.

30 Claims, 15 Drawing Sheets

(51) Int. Cl.
*G06T 7/73* (2017.01)
*G06T 7/246* (2017.01)

(56) References Cited

U.S. PATENT DOCUMENTS

| | | |
|---|---|---|
| 2009/0028384 A1 | 1/2009 | Bovyrin et al. |
| 2013/0147961 A1 | 6/2013 | Gao et al. |
| 2013/0169822 A1 | 7/2013 | Zhu et al. |
| 2015/0029345 A1 | 1/2015 | Ikeda |

OTHER PUBLICATIONS

Yin F., et al., "Calibration and Object Correspondence in Camera Networks with Widely Separated Overlapping Views", IET Computer Vision, vol. 9, No. 3, Jun. 2015, pp. 354-367, XP006052268, ISSN: 1751-9632, DOI: 10.1049/IET-CVI.2013.0301.

AUTOMATIC SCENE CALIBRATION METHOD FOR VIDEO ANALYTICS

FIELD

The present disclosure generally relates to video analytics, and more specifically to techniques and systems for automatic scene calibration for video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for automated scene calibration for video analytics. A video analytics system can, among other things, identify and track objects moving within the field of view of a camera. Objects are usually identified as blobs within a video frame. A blob represents at least a portion of one or more objects in a video frame (also referred to as a "picture"). Blob tracking can be used in, for example, surveillance applications. A camera supplied with video analytics can automatically identify moving objects and track the movement of the objects within the scene being viewed by the camera.

Tracking of objects moving in a scene can include determining the real-world size, moving speed, and/or location of each object. To determine real-world information about objects moving in a scene, the camera capturing the scene is typically calibrated to the scene. Specifically, the camera is configured with, for example, the camera's height from the ground, the camera's horizontal rotation relative to the ground (e.g., the camera's yaw), the camera's vertical rotation relative to the ground (e.g., the camera's pitch), and the camera's side-to-side rotation relative to the horizon (e.g., the camera's roll). Using the calibration information, the camera can estimate the properties of objects in the scene.

According to at least one example, a method for automated scene calibration is provided that includes identifying a blob determined from a current video frame as associated with an object. The blob can include pixels that represent a portion of the object. The portion can be less than the whole object. The method further includes determining, using the blob, a ground plane for the current video frame. The ground plane can represent a surface upon which the object is positioned. The method further includes selecting approximate three-dimensional points on the ground plane. The method further includes estimating extrinsic parameters for a camera model. The method further includes determining, using the camera model and the estimated extrinsic parameters, two-dimensional coordinates within the current video frame for the approximate three-dimensional points. The method further includes determining, using the two-dimensional coordinates and the ground plane, values for a homographic matrix. A homographic transformation using the homographic matrix can provide a mapping from two-dimensional coordinates in the video frame to three-dimensional real-world points.

In another example, an apparatus is provided that includes a memory configured to store video data and a processor. The processor is configured to and can identify a blob determined from a current video frame as associated with an object. The blob can include pixels that represent a portion of the object. The portion can be less than the whole object. The processor is configured to and can determine, using the blob, a ground plane for the current video frame. The ground plane can represent a surface upon which the object is positioned. The processor is configured to and can selecting approximate three-dimensional points on the ground plane. The processor is configured to and can estimating extrinsic parameters for a camera model. The method further includes determining, using the camera model and the estimated extrinsic parameters, two-dimensional coordinates within the current video frame for the approximate three-dimensional points. The method further includes determining, using the two-dimensional coordinates and the ground plane, values for a homographic matrix. A homographic transformation using the homographic matrix can provide a mapping from two-dimensional coordinates in the video frame to three-dimensional real-world points.

In another example, a computer readable medium is provided having stored thereon instructions that when executed by a processor perform a method that includes: identifying a blob determined from a current video frame as associated with an object. The blob can include pixels that represent a portion of the object. The portion can be less than the whole object. The method further includes determining, using the blob, a ground plane for the current video frame. The ground plane can represent a surface upon which the object is positioned. The method further includes selecting approximate three-dimensional points on the ground plane. The method further includes estimating extrinsic parameters for a camera model. The method further includes determining, using the camera model and the estimated extrinsic parameters, two-dimensional coordinates within the current video frame for the approximate three-dimensional points. The method further includes determining, using the two-dimensional coordinates and the ground plane, values for a homographic matrix. A homographic transformation using the homographic matrix can provide a mapping from two-dimensional coordinates in the video frame to three-dimensional real-world points.

In another example, an apparatus is provided that includes means for identifying a blob determined from a current video frame as associated with an object. The blob can include pixels that represent a portion of the object. The portion can be less than the whole object. The apparatus further comprises means for determining, using the blob, a ground plane for the current video frame. The ground plane can represent a surface upon which the object is positioned. The apparatus further comprises means for selecting approximate three-dimensional points on the ground plane. The apparatus further comprises means for includes estimating extrinsic parameters for a camera model. The apparatus further comprises a means for determining, using the camera model and the estimated extrinsic parameters, two-dimensional coordinates within the current video frame for the approximate three-dimensional points. The apparatus further includes a means for determining, using the two-dimensional coordinates and the ground plane, values for a homographic matrix. A homographic transformation using the homographic matrix can provide a mapping from two-dimensional coordinates in the video frame to three-dimensional real-world points.

In some aspects, the camera model provides a mapping from three-dimensional real-world points to two-dimensional coordinates in the current video frame. In some aspects, homographic transformation provides a mapping from one coordinate system to another coordinate system. In some aspects, extrinsic parameters include at least three rotational parameters and two translational parameters. In some aspects, the camera model is a pinhole camera model.

In some aspects, the methods, apparatuses, and computer-readable medium described above further comprise determining the two-dimensional coordinates using virtual intrinsic parameters. In these aspects, the virtual intrinsic parameters include at least a focal length and an optical center.

In some aspects, the object associated with the blob determined from the current video frame includes a person. In these aspects, the pixels included in the blob include at least an upper body of the person. In these aspects, the methods, apparatuses, and computer-readable medium described above further comprise determining the ground plane using an estimated height of the person to locate an approximate position of one or both feet of the person.

In some aspects, the object includes a person. In these aspects the pixels included in the blob include at least a face of the person. In these aspects, the methods, apparatuses, and computer-readable medium described above further comprise determining the ground plane using an estimated distance between eyes of the person and an estimated height of the person to locate an approximate position of one or both feet of the person.

In some aspects, the methods, apparatuses, and computer-readable medium described above further comprise using random sample consensus to improve the estimated extrinsic parameters.

In some aspects, the methods, apparatuses, and computer-readable medium described above further comprise determining, using a cost function, a cost value for the estimated extrinsic parameters. In these aspects, determining the cost value includes determining an estimated height of an object in the current video frame using the estimated extrinsic parameters. aspects further include determining a detected height of the object using coordinates of the object within the current video frame. These aspects further include comparing the estimated height and the detected height using the cost function.

In some aspects, the methods, apparatuses, and computer-readable medium described above further comprise determining the estimated height by determining, using the homographic matrix, a three-dimensional point for two-dimensional coordinates of a bottom of the object, wherein the two-dimensional coordinates are within the current video frame. These aspects further include determining two-dimensional coordinates of a top of the object using the camera model and an estimated real-world height of the object.

In some aspects, the methods, apparatuses, and computer-readable medium described above further comprise determining a plurality cost values for a plurality of extrinsic parameters, the plurality of cost values including the cost value. These aspects further include identifying from the plurality of cost values a set of extrinsic parameters with the lowest cost value.

In some aspects, the cost function is a size-pose-based cost function.

In some aspects, the methods, apparatuses, and computer-readable medium described above further comprise using the estimated extrinsic parameters for tracking objects in a video.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
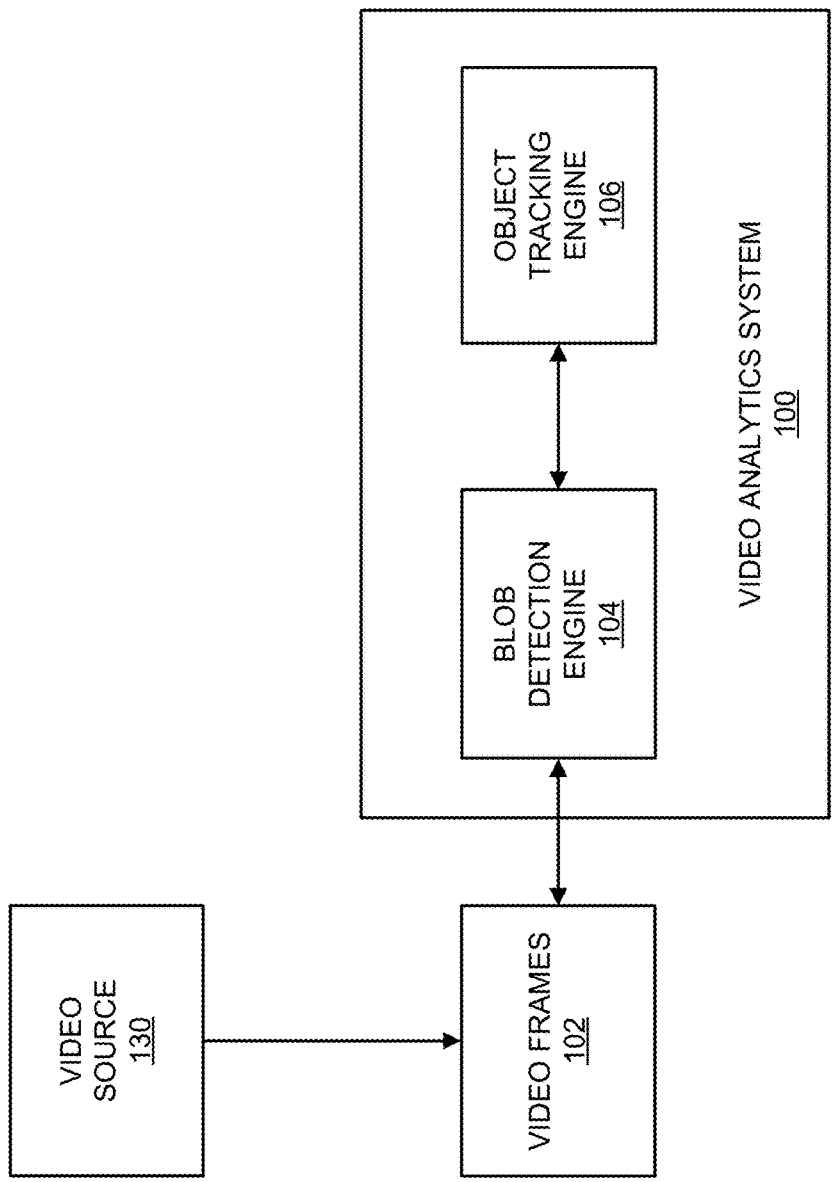
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and sends an alert or alarm to a central control room to alert a user of the event of interest.

Tracking of objects moving in a scene can include determining the real-world size, moving speed, and/or location of each object. Knowing the real-world size and motion of an object, rather than the object's size and location relative to a video frame on a screen, can provide important information about the object. For example, an object in the real world can be identified as a person who is five feet, five inches tall, who entered the scene from behind a building three yards away from the camera, and who is moving away from the camera. In contrast, relative to a video frame, the person may appear as only three inches tall, and the only movement information that can be determined is that the person is moving from left to right across the screen.

To determine real-world information about objects moving in a scene, the camera capturing the scene is typically calibrated to the scene. Specifically, the camera is configured with, for example, the camera's height from the ground, the camera's horizontal rotation relative to the ground (e.g., the camera's yaw), the camera's vertical rotation relative to the ground (e.g., the camera's pitch), and the camera's side-to-side rotation relative to the horizon (e.g., the camera's roll). Using the calibration information, the camera can estimate the properties of objects in the scene. While a camera can be manually calibrated, automatic scene calibration is more desirable. Cameras that can automatically calibrate to a scene can be easier and faster to deploy, and can automatically adjust should the camera be moved to a new location.

Automatic scene calibration can be accomplished using people that are found moving about in the scene. During a calibration period, a video content analysis system processing video frames from a camera can identify blobs that are associated with pedestrians or people. Using an assumed or estimated height of a typical person, the video content analysis system can use the location of the person's head and feet (e.g., the top and bottom of the person) to determine a correlation between the person's location in the two-dimensional (2-D) video frame (also referred to as the image plane) and the person's location in the three-dimensional (3-D) real world. As discussed further below, this correlation can be used to establish the camera's calibration parameters.

In many cases, however, only part of a person may be visible in a scene. This may particularly be the case in indoor applications, where people may be closer to the camera and their feet may not be visible. Without having both the location of the top of a person's head and the location of the person's feet, systems that rely on detecting people moving about in a scene may not able to estimate a camera's calibration parameters.

In various implementations, automatic scene calibration can use upper-body detection methods and facial detection methods when only the upper part of a person is visible in a scene. By detecting a person's upper body and/or facial characteristics, a video content analysis system can estimate the location of the person's feet, and use this estimate to establish a "ground plane", that is, a planar surface in the real world upon which the person is assumed to be standing. The ground plane is generally seen by a camera from a particular perspective, where the perspective can be defined by the camera's height from the ground plane and rotation (left, right, up, down, and/or side-to-side) relative to the ground plane. A camera's rotation and three-dimensional real-world coordinates (usually referred to as the camera's "translation") are usually referred to as the camera's extrinsic parameters.

A camera's intrinsic and extrinsic parameters can be described by a pinhole camera model. A pinhole camera is a box with a single, small aperture—typically pinhole-sized—in one side, and with no lens. Light from a scene passes through the aperture and projects an inverted image on the interior of the box, where film can be placed. As discussed further below, a model based on the pinhole camera includes intrinsic parameters and extrinsic parameters. Intrinsic parameters include the camera's focal length and optical center. In various implementations, the pinhole camera model can be supplied with "virtual" intrinsic parameters; that is intrinsic parameters obtained from any camera can be used to calibrate a particular camera. The particular intrinsic parameters used generally do not affect the final calibration results, because, assuming the intrinsic parameters reflect realistic intrinsic parameters, estimated extrinsic parameters can adjust to the particular intrinsic parameters, and achieve usable resulting extrinsic parameters. In essence the particular camera used to capture a scene does not matter.

Extrinsic parameters, however, can be difficult to determine. The pinhole camera model can map 3-D real-world coordinates to 2-D image coordinates. In object tracking, however, a video content analysis system receives a two-dimensional video frame, and mapping objects from 2-D coordinates in the video frame to 3-D real-world coordinates may not be straightforward. Thus, in various implementations, a video content analysis system as disclosed herein can apply various methods for mapping objects in a video frame to the objects' real-world coordinates on the ground plane. Methods for mapping from the video frame to the real world can be made possible by estimating the location of the ground plane using people detected moving in a scene.

In various implementations, the video content analysis system as disclosed herein can further use such methods for mapping from the 2-D image plane to the 3-D real world to determine suitable extrinsic parameters for a camera. Given the image plane coordinates of the top and bottom of an object, as well as the real-world height of the object, the system can evaluate estimated extrinsic parameters. Specifically, the system can select reasonable extrinsic parameters. The system can further randomly select points on an assumed ground plane. The system can then obtain 2-D image coordinates for the randomly selected points using the pinhole camera model and the estimated extrinsic parameters. Next, the system can determine a matrix that maps the 2-D image coordinates for the random points to 3-D real-world coordinates. The resulting matrix can be used to test the accuracy of the estimated extrinsic parameters.

To test the accuracy of the estimated extrinsic parameters the video content analysis system as disclosed herein can map the location of the bottom of an object (e.g., a person detected in the video frame) from the 2-D image plane to 3-D real-world coordinates using the matrix. The system can then use an estimated real-world height of the object (e.g., the person) to determine the 3-D coordinates of the top of the object. Using these 3-D coordinates and again applying the pinhole camera model and the estimated extrinsic parameters, the system can map the top of the object to the image plane. The system then has an image plane coordinate for both the top and the bottom of the object. From these coordinates, which can be given in pixels, centimeters, inches, or some other unit of measure, the system can calculate an estimated height of the object in the 2-D image plane.

The video content analysis system can also calculate the actual and correct height of the object as seen in the video frame. For example, the object may be represented by a bounding box, which has horizontal and vertical coordinates relative to the boundaries of the video frame. The height of the bounding box thus can represent the height of the object in pixels, centimeters, inches, etc. The accuracy of the estimated extrinsic parameters can thus be tested by comparing the detected height of the object against the estimated height determined as described above.

To improve on the estimated extrinsic parameters, the system can apply a hierarchical global estimation mechanism, which can speed up the extrinsic parameter estimation and overcome possible local minimums. Using this mechanism, the system can first test a series of coarse granularity extrinsic parameters and record the more promising ones. The system can then test extrinsic parameters around the recording parameters with finer and finer steps within a smaller and smaller area. In various implementations, to improve the robustness of the extrinsic parameter estimation, a random sample consensus (RANSAC) method can be applied for a set of the objects present in the scene. In these implementations, the system can select the extrinsic parameters that best fit most of the objects in the scene.

Using the above-described approach, suitable extrinsic parameters can be found that lead to accurate object tracking. The physical meaning of the intrinsic and extrinsic parameters can thus be inconsequential.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, and a history of the velocity, and a history of location, of continuous frames, for the blob tracker, as described in more detail below.

As described in more detail below, a motion model for a blob tracker can determine and maintain two locations of the blob tracker for each frame (e.g., a first location that includes a predicted location in the current frame and a second location that includes a location in the current frame of a blob with which the tracker is associated in the current frame). As also described in more detail below, the velocity of a blob tracker can include the displacement of a blob tracker between consecutive frames.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3-4.

Figure 2:
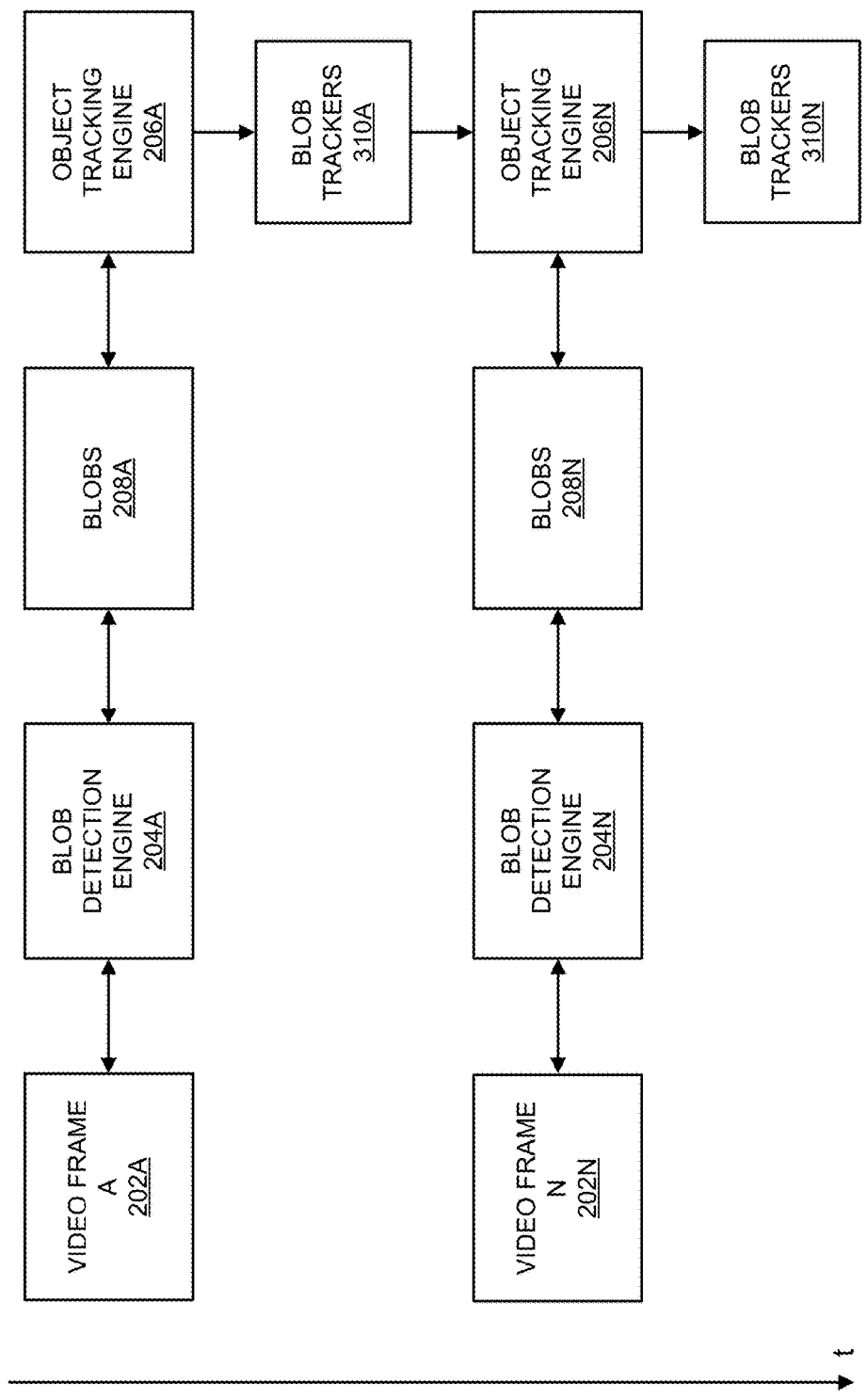
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
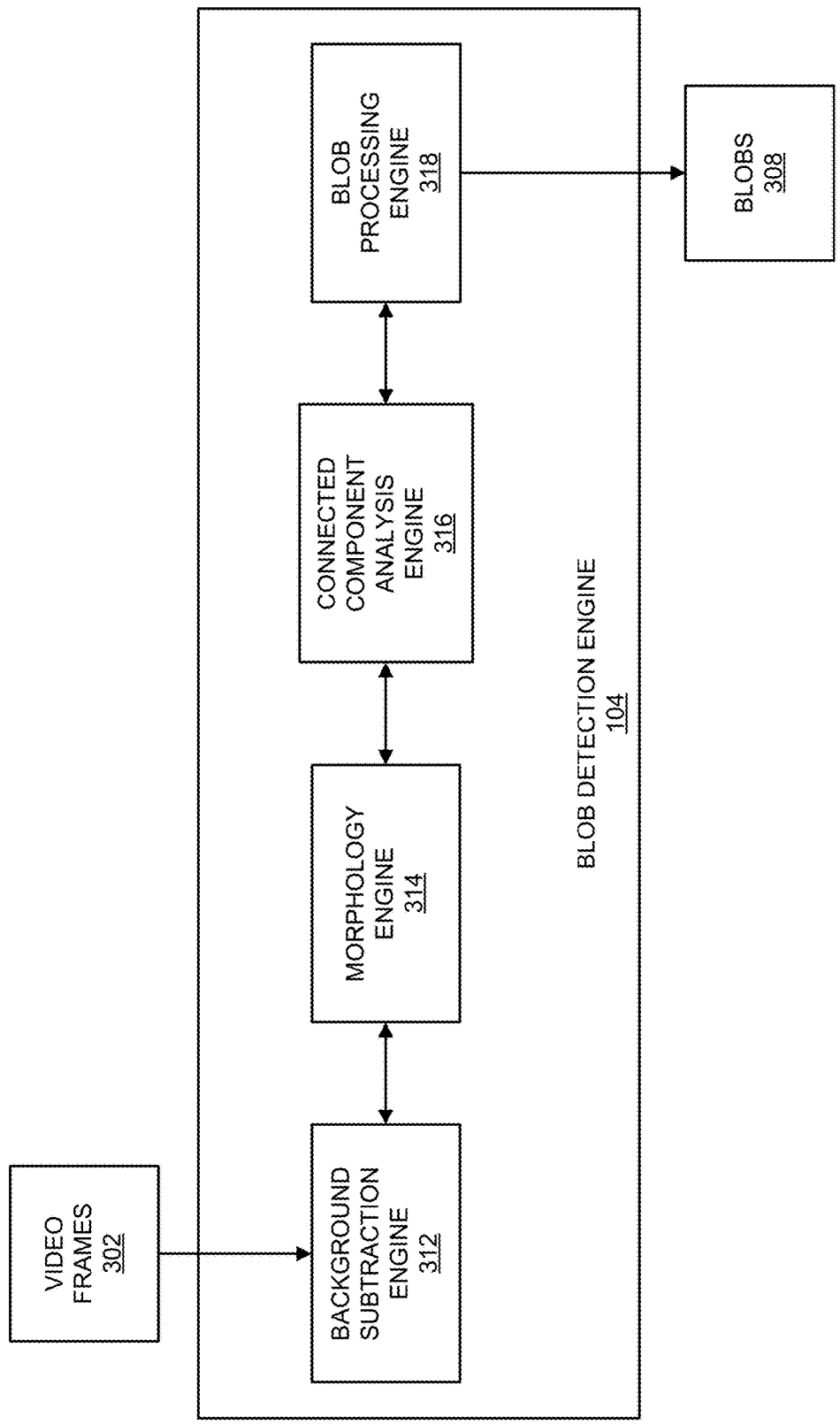
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t}) \quad \text{Equation (1)}$$

An equation of the GMM model is shown in equation (1), wherein there are K Gaussian models. Each Gaussian model has a distribution with a mean of μ and variance of Σ, and has a weight ω. Here, i is the index to the Gaussian model and t is the time instance. As shown by the equation, the parameters of the GMM change over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with a 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

```
for each pixel of the foreground mask {
    -if it is a foreground pixel and has not been processed, the
    following steps apply:
        -Apply FloodFill function to connect this pixel to other
        foreground and
generate a connected component
        -Insert the connected component in a list of connected
        components.
        -Mark the pixels in the connected component as being
        processed. }
```

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
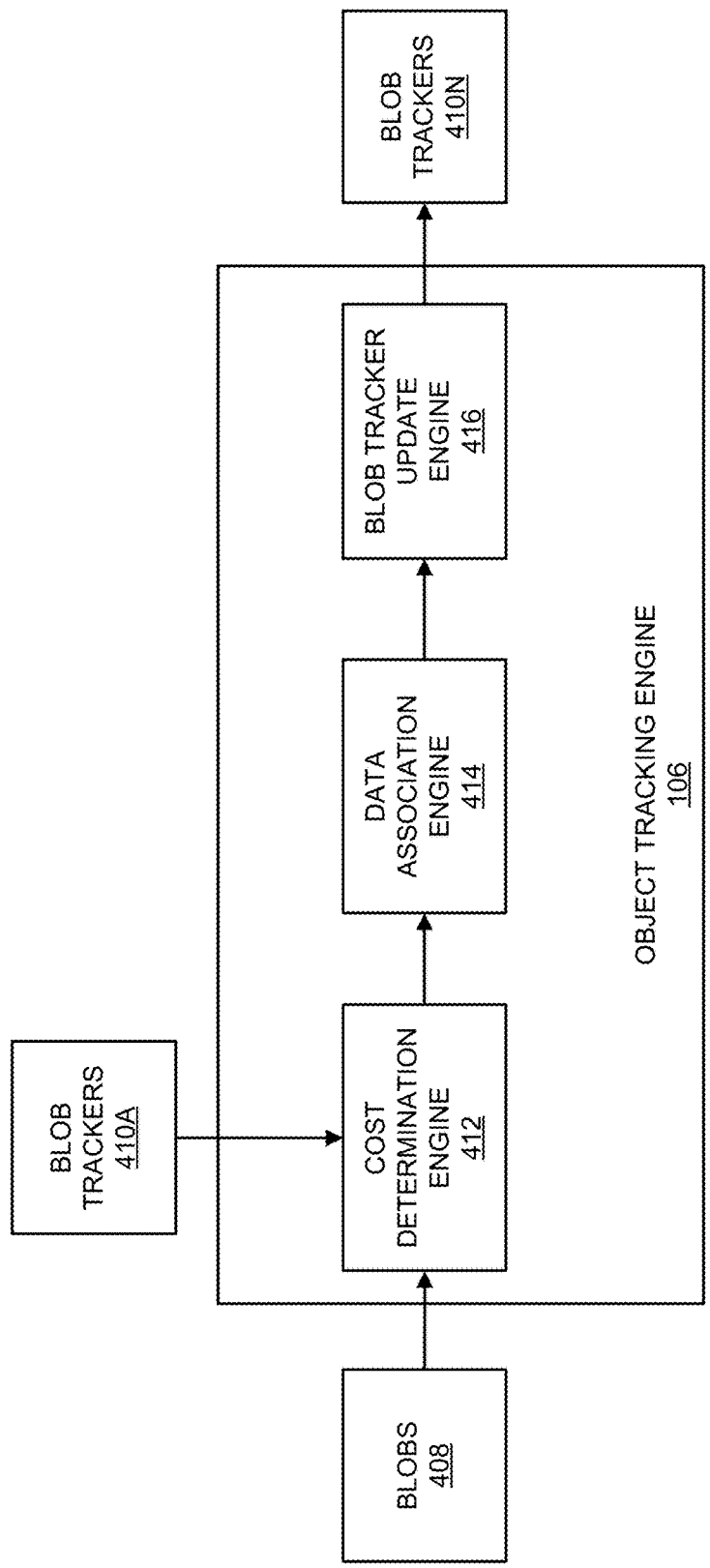
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$\text{Cost}_{tb} = \sqrt{(t_x-b_x)^2+(t_y-b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicated from a previous frame (e.g., using a location of a blob associated with the blob tracker in the previous frame). The calculated distance between the identified blobs and estimated trackers is used for data association. After the data association for the current frame, the tracker location in the current frame can be identified with its associated blob's (or blobs') location in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can include the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified at its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. A tracker that is not promoted as a normal tracker can be removed (or killed), after which the track can be considered as dead.

Object tracking can include identifying objects moving in a scene, as well as determining the size, speed of motion of the object, and real-world location, among other things. To determine an object's size, speed, and location, a video content analysis system needs a way to correlate the pixels that represent the object in the video frame to the real world. "Real world" in this sense means the physical, three-dimensional world being viewed by the camera, as opposed to the two-dimensional representation of the world captured in video frames. Generally, a video content analysis system uses a camera's calibration parameters to map coordinates in the 2-D video frame to 3-D points in the real world.

A camera's calibration parameters include intrinsic parameters and extrinsic parameters. Intrinsic parameters describe physical features of the camera itself, including the camera's focal length and center. Extrinsic parameters describe physical aspects external to the camera, such as where the camera is located and how the camera is positioned. For example, the camera can have a particular height from the ground, as well as up and down (e.g., pitch), left-to-right (e.g., yaw), and side-to-side (e.g., roll) rotation relative to the ground. A camera's position is usually referred to as the camera's translation, and the camera's pitch, yaw, and/or roll is referred to as the camera's rotation.

Many calibration methods are based on the pinhole camera model, which is described below. Given a set of intrinsic camera parameters and some selected real-world coordinates, a camera matrix, which captures the intrinsic and extrinsic parameters, can be obtained. With the camera matrix, real-world coordinates can be mapped to an image plane. By manually adjusting the extrinsic parameters used in the pinhole camera model, a ground plane can be established for the scene. The extrinsic parameters can then be used to estimate the size of objects in the scene.

Various methods can be used to automatically calibrate a camera for the scene being viewed by the camera, though most methods require manual assistance, and may achieve different results. For example, in one method, the camera is interactively and manually calibrated by assuming that the height of the camera is known, or by manually measuring the height of the camera. That is, given the height of the camera, an operator may adjust the camera's extrinsic parameters until the operator sees a satisfactory match between the video frames and the real world. As another example, in another method, the height and tilt angle of the camera can be measured, and the remaining extrinsic parameters can be automatically determined using a set of parallel lines defined in the scene. Besides requiring that the height and tilt angle be measured, however, this method may require that objects or markings be manually placed in the scene, either in the real world or in the video frame. Alternatively, this method can be modified by using a measured length value, typically measured perpendicular to a linear aspect in the scene, such as road edge. This measured value can replace the height and tilt angle, but also may require that the scene be manually marked.

Other scene calibration methods can use perspective transformations to estimate the physical size of objects, but require that the objects being used for these transformations be manually labeled or marked. Additionally, the height of the objects (e.g., in pixels per meter) may need to be pre-determined and provided to the scene calibration process. These processes may also require that objects being used be scattered as widely across the field of view as possible. In some cases, these methods may further require that an operator tune the extrinsic parameters manually, using the perspective transformations as guides.

The pinhole camera model is useful for mapping 3-D real-world points to 2-D coordinates in a flat image, but is less useful for mapping 2-D points in a video frame to 3-D real world points when the camera's extrinsic parameters are not known. In object tracking, a video content analysis system receives two-dimensional video frames, and from those video frames needs to determine the real-world size and movement rate of objects in the real world. The 2-D to 3-D mapping problem may be more easily solved in outdoor applications. When the scene being viewed by a camera is outdoors, it may be possible to apply pedestrian detection methods and detect people moving around in the scene. When all of a person, from head to foot, is visible, the system may be able to derive calibration parameters from a bounding box that is associated with the person. In indoor applications, however, the field of view may be more limited, such that the lower part of people in the scene may not be visible. This may be true in many outdoor applications as well, when the camera's field of view is restricted or the location of people's feet is obstructed. When not able to determine the location of people's feet in the scene, the system may be unable to determine the ground plane in the scene, and determining real-world coordinates of objects without the ground plane may be difficult.

In various implementations, a video content analysis system can be provided with an automated scene calibration system that does not require manual assistance to determine calibration parameters, and also does not require that the entire body of a person be in the scene. In various implementations, the automated scene calibration system can use a person's upper body and/or face to extrapolate the location of the person's feet. This extrapolation can be provided with an estimated or assumed height of the person and/or an estimated or assumed distance between the person's eyes, both of which can be based on statistical averages for human body geometry. Using the estimated location of the person's feet, the system can estimate the location of the ground plane in the scene. The system can also use a person's whole body, when it is available. The system can further apply a RANSAC approach to find the best extrinsic parameters that suit the most objects (that is, people) in the scene.

More specifically, a video content analysis system can use background subtraction and blob detection to extract and identify objects moving in a scene. The system can then apply person detection methods, including whole body detection, upper body detection, and facial detection. Using objects identified as people, the system can estimate the location of the ground plane in the scene by determining where the people's feet are located relative to the video frame. The location of the people's feet is assumed to be where the ground plane is located. In various implementations, objects other than people can be used to determine calibration parameters, when the objects are readily identifiable and the height of the objects can be provided.

The video content analysis system can then use the estimated location of the ground plane to develop a homographic matrix that can be used in a homographic transformation to map 2-D coordinates in a video frame to 3-D points in the real world. Specifically, the system can use virtual intrinsic parameters and estimated extrinsic parameters to determine a homographic matrix. The system can then test the estimated extrinsic parameters using a hierarchical variable granularity algorithm that applies a size-pose-based cost function. Using this algorithm, the system can find the best extrinsic parameters by testing multiple estimated extrinsic parameters to find the ones with the lowest cost. The system can apply a non-maximum suppression method to locate potential extrinsic parameters around which to search. For potential extrinsic parameters, the system can then search with finer granularity in smaller areas until the lowest cost extrinsic parameters are found. In this method, virtual intrinsic parameters (the intrinsic parameters for some camera, not necessarily the camera being calibrated) can stand in for the intrinsic parameters of the real camera.

The size-pose-based cost function can compensate for estimated extrinsic parameters that locate the top of an object too far from the correct location. Specifically, a size-posed-based penalty can be applied to the cost determined for these extrinsic parameters. The size-pose-based cost function thus can compensate for cases where a person in a scene is not upright with respect to the video frame.

In various implementations, the first step for automated scene calibration is to locate the ground plane in a scene being viewed by a camera. In various implementations, an automated scene calibration system does not need an operator to manually mark objects in the scene. Instead, the automated scene calibration system can rely on objects that are moving about in the scene.

Figure 5:
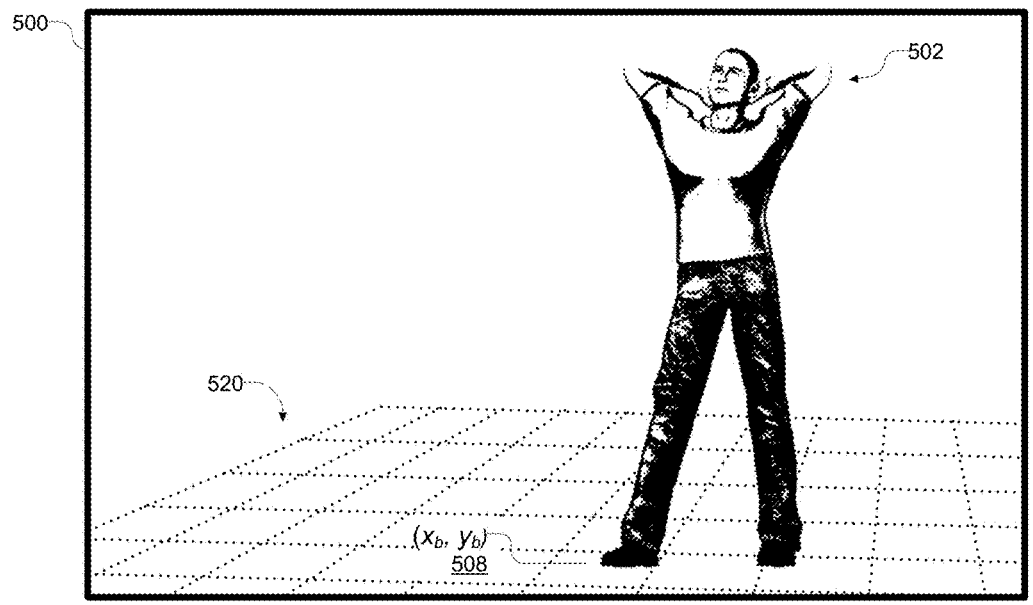
FIG. 5 illustrates an example of a video frame, where the video frame has captured a person moving within the scene.

People are convenient objects to use for automatic scene calibration. People can be highly mobile, and the real-world height of people moving in a scene can be based on statistical averages. FIG. 5 illustrates an example of a video frame 500, where the video frame 500 has captured a person 502 moving within the scene. A video content analysis system may have first detected the person 502 as a blob, using background subtraction, morphology operations, connected component analysis, and blob processing, as discussed above. The video content analysis system may then apply various methods to determine that the particular blob represents a person 502.

Various pattern recognition methods can be used to detect people in an image such as a video frame. One example method is based on a support vector machine (SVM) with histogram of oriented gradients (HOG) features. A support vector machine is a supervised learning model with associated learning algorithms, frequently used in machine learning applications. A support vector machine can analyze data used for classification and regression analysis. Given a set of training examples, each marked as belonging to one of two categories, a support vector machine training algorithm can build a model that assigns new examples into one category or another. A support vector machine model can represent the examples as points in space, mapped so that the examples of the separate categories are divided by a clear gap that is as wide as possible. New examples are then mapped into that same space and predicted to belong to a category based on which side of the gap they fall on. A histogram of oriented gradients is a feature descriptor used in computer vision and image processing for the purpose of object detection. The technique counts occurrences of gradient orientation in localized portions of an image. This method is similar to that of edge orientation histograms, scale-invariant feature transform descriptors, and shape contexts, but differs in that it is computed on a dense grid of uniformly spaced cells and uses overlapping local contrast normalization for improved accuracy.

A person detection process can apply a sliding window approach to detect a person in each window the person slides into. Specifically, a rectangular region or "window" can be defined that is smaller than the image, and the window can be moved to different locations within the image. At each location, a histogram of oriented gradients features can be extracted as follows: the window can be divided into M×N blocks, which can overlap. Each block can further be divided into non-overlapping cells. The histogram of quantized oriented gradients can be calculated for each cell; the result from all the cells in a block can form a feature vector. All the feature vectors from all the blocks can form a final feature vector. The feature vector can be fed into a support vector machine to be classified as "person" or "not person." The image can be resized and scanned with the same method again to detect a person that might be at a different scale, due to being closer to or further from the camera. With this method, all people at different scales can be detected.

Another example method for detecting a person in an image is based on an adaptive boosting (AdaBoost) algorithm with Haar-like features. This method originally applies to facial detection, and can be extended to detection of pedestrians. A Haar-like feature considers adjacent rectangular regions at a specific location in a detection window, sums up the pixel intensities in each region, and calculates the difference between these sums. This difference can then be used to categorize subsections of an image. For example, it is a common observation that among all faces the region of the eyes is darker than the region of the cheeks. Therefore a common Haar feature for face detection can be a set of two adjacent rectangles that lie above the eye and the cheek region. The position of these rectangles can be defined relative to a detection window, where the detection window can define a region that includes the target object (e.g., a face in this example).

Haar features can be considerably large in number, however, and evaluating every feature can be computationally time consuming. Thus, a set of important features can be provided to an AdaBoost algorithm. AdaBoost can combine a "weak" classifier (e.g., a set of Haar features) into a weighted sum that represents a boosted classifier. The individual classifiers can be weak, but as long as the performance of each one is slightly better than random guessing, the final model can converge to a strong classifier.

Having identified an object in the video frame 500 as a person 502, a video content analysis system can then estimate the location of the ground plane 520 in the video frame 500. Specifically, the system can assume that the person 502 is standing on the ground or floor of the scene, where the ground plane 520 can be described by coordinates within the video frame 500. To establish the coordinates of the ground plane 520, the system can use the coordinates of the person's feet, $(x_b, y_b)$ 508 within the frame, as a point on the ground plane 520. The coordinates $(x_b, y_b)$ 508 can be, for example, taken from a bounding box that is associated with the person 502 (or, more specifically, with the blob that represents the person). For example, the coordinate $x_b$ can be taken from the horizontal mid-point of the bottom edge of the bounding box, and $y_b$ can be taken from the vertical location of the bottom of the bounding box. The coordinates $(x_b, y_b)$ 508 can be expressed in pixel units, centimeters, inches, or some other unit of measure, relative to the boundaries of the video frame 500.

One person 502 in one video frame 500 can thus provide one reference point for the ground plane 520. An additional person in the same video frame 500 can provide an additional reference point, which may be sufficient to determine a reasonable estimate of the location of the ground plane 520. When the scene includes many people, the estimated location of the ground plane 520 can be more accurate. Alternatively or additionally, a video content system may apply a calibration period, during which multiple video frames are analyzed and used for calibration. One person in the scene, detected in different locations in each frame, may provide enough reference points to determine an estimated location of the ground plane. More people moving in the scene can, of course, improve the estimation.

In various implementations, during a calibration period, a video content analysis system can track objects identified as people, and evaluate the consistency of the object detection. In these implementations, objects that show consistency in size and direction of movement can be given higher priority than other objects, such that the higher priority objects are counted as giving a more accurate estimation of the location of the ground plane. In some implementations, only objects that have consistent size and movement are used for estimating the location of the ground plane.

In many cases, however, a person may be detected in a scene but the person's feet are not within the video frame. For example, the person may be particularly close to the camera, such that only his upper body and/or face are within the video frame. This may occur frequently in indoor scenes, where the camera is focused on a smaller or more confined area.

Figure 6:
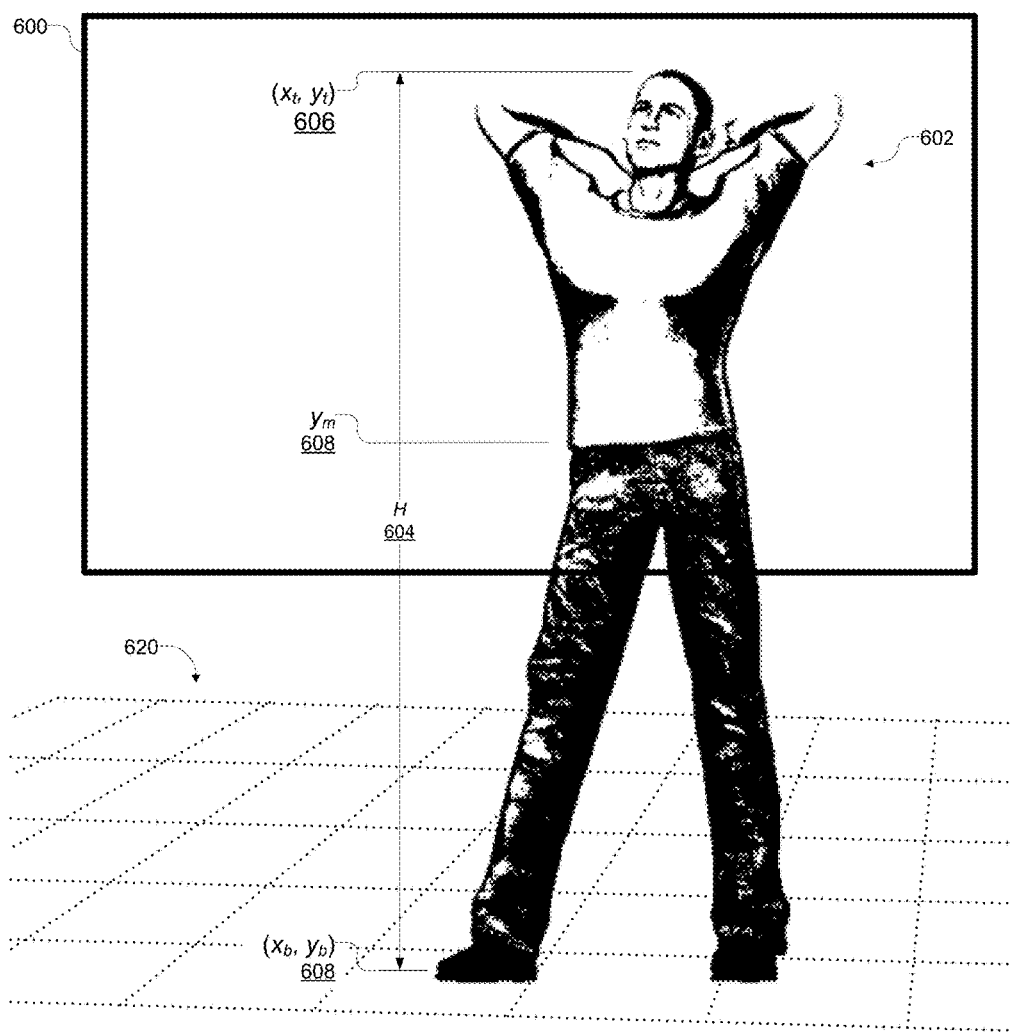
FIG. 6 illustrates an example of a video frame where a person's upper body is visible in the video frame, but the person's feet are not.

FIG. 6 illustrates an example of a video frame where a person's 602 upper body is visible in the video frame 600, but the person's 602 feet are not. A video content analysis system may have first detected a blob in the video frame 600, and, having applied people detection methods, have identified the blob as part of a person 602. Having identified a person 602 in the scene, the system may next estimate the location of the person's 602 feet in order to determine an approximate location of the ground plane 620 in the manner discussed above.

To determine the coordinates $(x_b, y_b)$ 608, the video content analysis system can begin with the coordinates of the top of the person 602, $(x_t, y_t)$ 606, which is within the video frame 600. For example, the system can take the coordinates, $(x_t, y_t)$ 606, from a bounding box that may be associated with the person 602. For example, the coordinates $x_t$ can be taken from the horizontal mid-point of the top edge of the bounding box, and $y_t$ can be taken from the vertical location of the top of the bounding box. The system can then apply an estimated height, H 604, of the person 602 to obtain the coordinates $(x_b, y_b)$ 608 of the person's feet. The estimated height H 604 can be obtained from statistical averages for adults in a given population. For example, the average height of an adult person can be assumed to be 1.7 meters (5 feet, 6 inches). In various implementations, the estimated height H 604 can be configured for or learned from a particular scene.

Using the coordinates $(x_t, y_t)$ 606 of the person's 602 head and the person's 602 estimated height H 604, the system can determine the coordinates of the person's 602 feet using the following equation:

$$y_b = y_t + (y_m - y_t) * R_u$$

In the above equation, $y_m$ is a vertical coordinate of the person's 602 mid-section, that is, a point observed to be the person's 604 waistline, hipline, crotch level, or some other reference point defined in the middle area of the person. Additionally, $R_u$ is a ratio of the estimated height H 604 of the person 602 to the height of the person's 602 upper body, from the top of the person's 602 head to the waistline, hipline, crotch level, or whatever mid-section reference point is used. The ratio $R_u$ can also be determined from statistical averages.

The equation above thus provides the vertical coordinate $y_b$ of the person's 602 feet. The vertical coordinate $y_b$ will be outside the video frame 600; hence in various implementations the video content system can use values relative to the video frame 600 for $y_b$. For example, the system can use the lower left corner of the video frame 600 as coordinate (0, 0), such that $y_b$ (and, in this example, all vertical coordinates for the ground plane) will be a negative value. The horizontal coordinate $x_b$ of the person's 602 feet is assumed to be the same as $x_t$. Assuming that $x_b = x_t$ does assume that the person 602 is standing upright, any variation from upright (e.g., when the person 602 is leaning to one side and/or camera is at an angle from the person's upright position) can be compensated for in the size-pose-based cost function, discussed below.

One person 602 in one video frame 600 can provide one reference point for the ground plane 620, and in various implementations the system can use multiple people and/or multiple video frames to more precisely determine the location of the ground plane 620. In various implementations, the system may look for objects (e.g. people) who show consistent height and motion in the frame, and use these objects, over other objects, to establish the ground plane 620.

Figure 7:
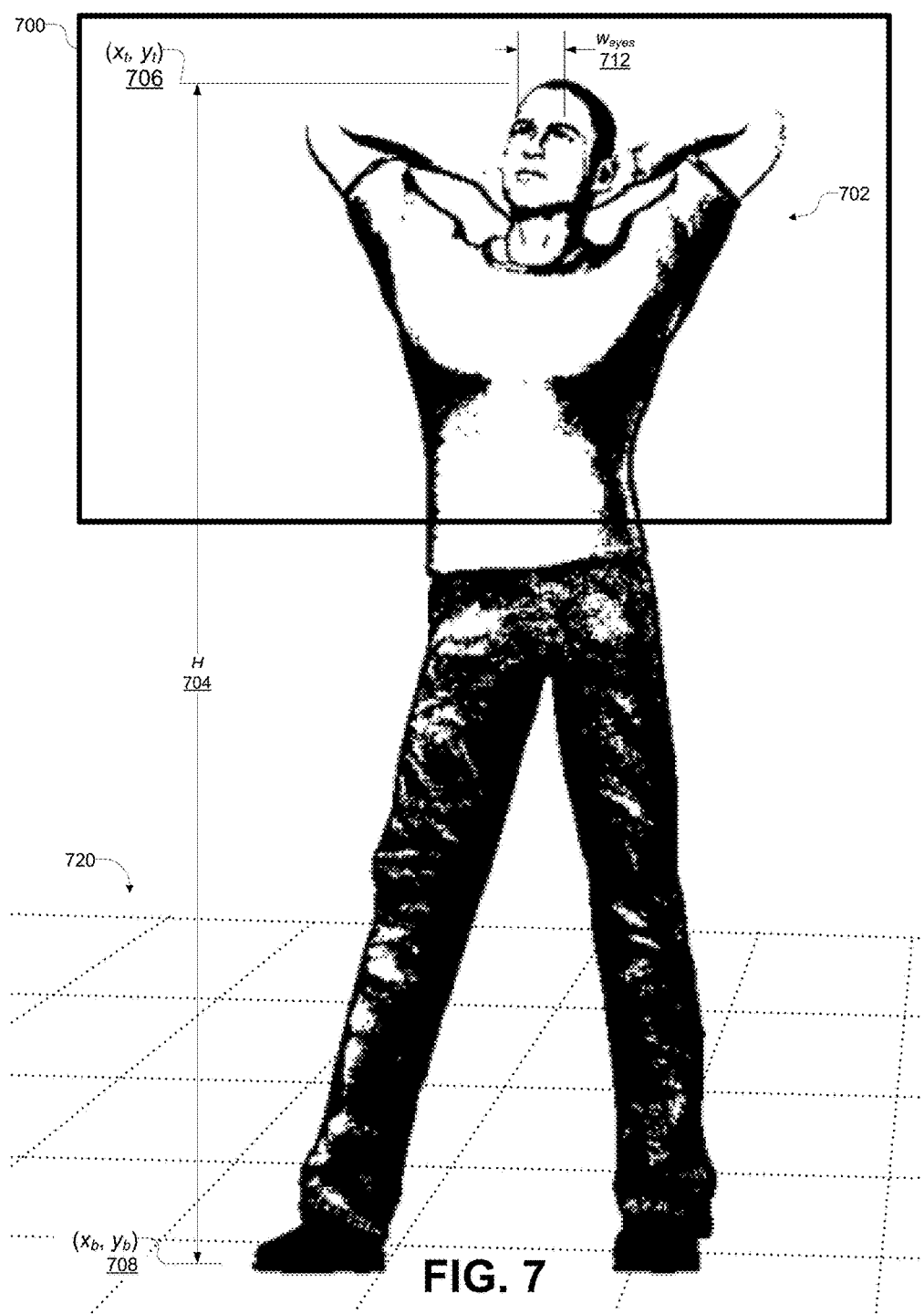
FIG. 7 illustrates an example of a video frame where a person's upper body is in the frame, but the person's mid-section is outside the frame.

In some cases, less than a person's upper body may be visible in a video frame. In these cases, a video content analysis system can use the person's face to estimate the location of the person's feet. FIG. 7 illustrates an example of a video frame 700 where a person's 702 upper body is in the frame 700, but the person's 702 mid-section is outside the frame 700. In this example, the video content analysis system may have identified a blob as associated with a person, and further may have applied facial recognition to locate the person's 702 facial features. The system can further estimate the position of the person's 702 head, including the head's yaw, pitch, and roll relative to the camera's view, to correct for cases where the person's 702 face is not directly and frontally facing the camera.

With this information, the system can then use an estimated distance between the person's 702 eyes to extrapolate the location of the person's 702 feet. Specifically, the system can determine the pixel location of the person's 702 eyes (possibly using data corrected for non-frontal presentations of the person's 702 face). The system can then compare the pixel distance (or centimeter distance, or inch distance, etc.), $w_{eyes}$ 712, between the person's 702 eyes against an estimated, real-world distance, $W_{eyes}$, between the person's 702 eyes. The real-world estimated distance $W_{eyes}$ can be determined from statistical averages. For example, a value of 6.4 centimeters (2.5 inches) can be used. Having thus established a scale for the person 702 within the video frame 700, the system can use the coordinates of the top of the person's 702 head $(x_t, y_t)$ 706 and an estimated height, H 704, to estimate coordinates, $(x_b, y_b)$ 708, for the person's 702 feet using the following equation:

$$y_b = y_t + H * \frac{(w_{eyes})}{W_{eyes}}$$

The above equation thus provides a vertical coordinate, $y_b$, for the person's 702 feet. The horizontal coordinate, $x_b$, can be assumed to be the same as $x_t$, and any angle of the person away from vertical can be compensated for in the size-posed-based cost function discussed below.

In various implementations, each of the methods described above with respect to FIGS. 5, 6, and 7 can be used in combination to determine the ground plane in a scene. In various implementations, full-body detection (as described with respect to FIG. 5), upper-body detection (as described with respect to FIG. 6), and facial detection (as described with respect to FIG. 7), can each be applied, as appropriate, to the pixels for a person detected in the scene. In various implementations, results from full-body detection may be given the highest weight and results from facial detection may be given lowest weight. The estimate location of the ground plane can be more accurate the more data is collected; hence the system may use as many people, spread as far as possible within the scene, to determine the ground plane.

In various implementations, the methods described above with respect to FIGS. 5, 6, and 7 can also be used with objects other than people. Generally, methods can be applied to identify the objects, and a video content system can be supplied with the geometry of the objects (e.g., where the top and bottom can be found) and an estimated height for the objects.

Figure 8:
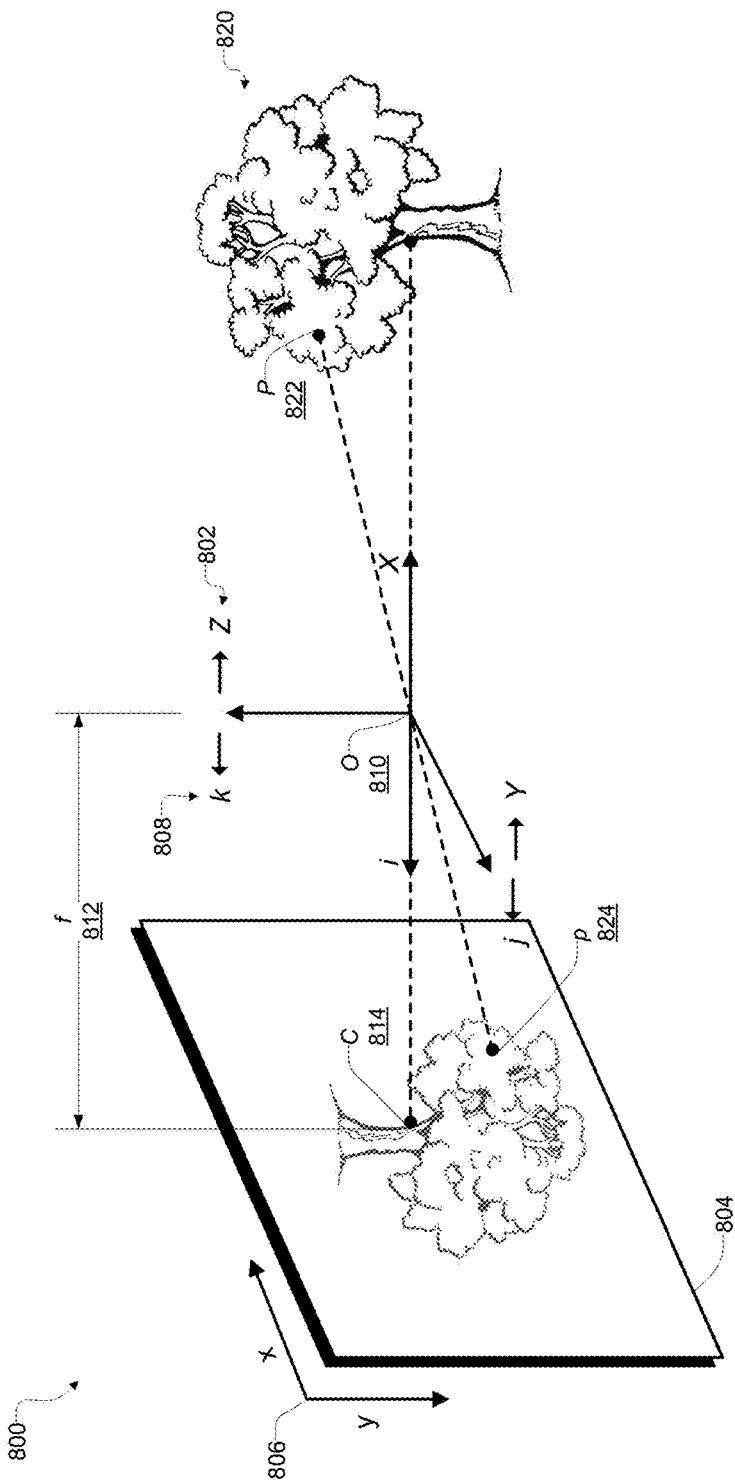
FIG. 8 illustrates a representation of the pinhole camera model.

In various implementations, a video content analysis system can use a ground plane, estimated as described above, and the pinhole camera model to estimate the extrinsic parameters for a camera. FIG. 8 illustrates a representation of the pinhole camera model 800. A pinhole camera is a simple camera without a lens and with a single small aperture. Light rays pass through the aperture and project an inverted image on the opposite side of the camera. The image can be captured onto photographic film. The surface where film would be placed is commonly called the image plane 804 or the retinal plane. The aperture is called the pinhole or center of the camera, O 810. The distance between the image plane 804 and O 810 is the focal length, f 812.

The pinhole camera model 800 can be used to map three-dimensional, real-world coordinates to the two-dimensional coordinate system 806 of the image plane. For example, a point P 822 on an object 820 in the real world can have 3-D coordinates [X, Y, Z]. The point P 822 can be projected or mapped to a point p 824, whose 2-D coordinates within the image plane are [x, y]. Note that, for convenience and clarity, capital letter variables (e.g., [X, Y, Z]) will be used herein to express three-dimensional, real-world coordinates, and lower-case variables (e.g., [x, y]) will be used to express two-dimensional coordinates within the image plane 804.

As illustrated in this example, the pinhole camera model includes three coordinate references systems: the three-dimensional real-world coordinate system 802 centered at O 810, the three-dimensional camera reference system [i, j, k]

808 centered at O 810, and the two-dimensional image plane reference system 808, centered at one corner of the image plane 804. Transforming the 3-D location of P 822 to P'=[X', Y', Z'] in the 3-D camera reference system 808 can be accomplished using the following equation;

$$P'\begin{bmatrix} X' \\ Y' \\ Z' \\ 1 \end{bmatrix} = \begin{bmatrix} R & T \\ 0 & 1 \end{bmatrix} \begin{bmatrix} X \\ Y \\ Z \\ 1 \end{bmatrix}$$

In this equation, R includes the rotational parameters of the camera (e.g., pitch, yaw, and/or roll), and T is a translation vector (e.g., the physical location of the camera). As noted above, rotation and translation are intrinsic parameters of the camera. The rotational parameters R can be expressed using the following equation:

$$R = \begin{bmatrix} 1 & 0 & 0 \\ 0 & \cos\gamma & -\sin\gamma \\ 0 & \sin\gamma & \cos\gamma \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\alpha & -\sin\alpha & 0 \\ \sin\alpha & \cos\alpha & 0 \\ 0 & 0 & 1 \end{bmatrix}$$

In the above equation, $\alpha$ is the yaw, or horizontal rotation, $\beta$ is the pitch, or up-and-down rotation, and $\gamma$ is the roll, or side-to-side rotation. The translation vector T can be expressed as:

$$T = \begin{bmatrix} X_T \\ Y_T \\ Z_T \end{bmatrix}$$

The camera's intrinsic parameters, K, can next be used to map P' from the camera reference system 808 to the image plane 804. This mapping is also referred to as a projective transformation. The camera's intrinsic parameters can be expressed as follows:

$$K = \begin{bmatrix} f_x & S & x_c \\ 0 & f_y & y_c \\ 0 & 0 & 1 \end{bmatrix}$$

In the above matrix, $f_x$ and $f_y$ are the focal length of the camera along the x and y axis, respectively; $(x_c, y_c)$ is the center of the image plane 804; and S is a skew factor. Skew occurs when the camera reference system 808 is not precisely perpendicular to the image plane 804.

Using the camera matrix, the 2-D location of p can now be determined from the 3-D coordinates of P' in the camera reference system 808, using the following equation:

$$p\begin{bmatrix} x \\ y \\ 1 \end{bmatrix} = \begin{bmatrix} f_x & s & x_0 \\ 0 & f_y & y_0 \\ 0 & 0 & 1 \end{bmatrix} \begin{bmatrix} X' \\ Y' \\ Z' \end{bmatrix}$$

The above group of equations thus provides a mapping for a point P 822 in the real world to a point p 824 in the image plane. A mapping from the two-dimensional image plane to the three-dimensional real world (for example, to identify where a person in a video frame is standing) can also be accomplished using these equations, when the extrinsic parameters are known. When the extrinsic parameters are not known, however, which would be the case during camera calibration, the above equations are less than helpful. For example, when the pinhole camera model is applied with an estimated extrinsic parameter to map a 2-D coordinate to a 3-D real-world point, the resulting 3-D coordinates would be a point in space without any reference to determine whether the point is correct.

Another method that can be used to map 2-D coordinates to 3-D points in space is a homographic transformation. Homographic transformation, also called homography transformation, describes the mapping of points from one reference system to another. Homographic transformation is often used in geo-referencing, which describes the process of scaling, rotating, translating, and/or de-skewing an image to match a particular size and/or position.

Figure 9:
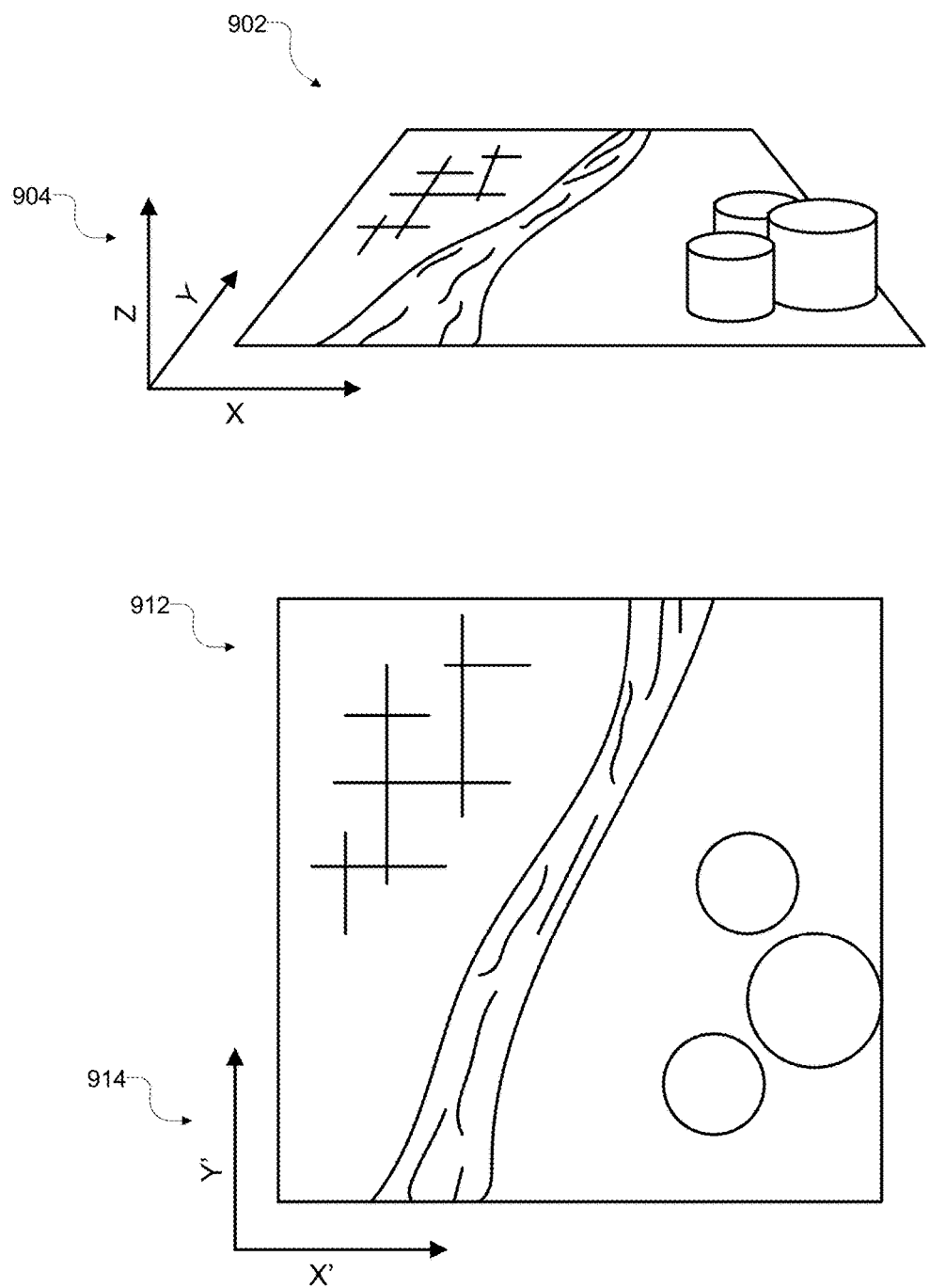
FIG. 9 illustrates an example of a homographic transformation from a perspective view to a planar view.

FIG. 9 illustrates an example of a homographic transformation from a perspective view 902 to a planar view 912. The perspective view 902 in this example is a three-dimensional view of a real-world scene from a point in space. As such, the perspective view 902 has a three-dimensional coordinate system 904, with X representing left-to-right coordinates, Y representing coordinates away from the viewer, and Z representing coordinates in the upwards direction from the scene. In contrast, the planar view 912 is a two-dimensional view, equivalent to looking down at the same scene from above. The planar view has a two-dimensional coordinate system 914, where X' represents left-to-right coordinates and Y' represents up-and-down coordinates.

The planar view 912 can be generated from the perspective view 902 by rotating and de-skewing the perspective view 902. Specifically, an axis of rotation can be established parallel to the X axis, and the top of the perspective view 902 can be rotated towards the viewer while the bottom of the perspective view 902 is rotated away from the viewer. The top of the perspective view 902 can also be de-skewed to correct for the vanishing point. This rotation and de-skewing can be accomplished by various mathematical operations. The particular mathematical operations required in any homographic transformation can depend on the particular source reference system and target reference system.

FIG. 9 illustrates one example of a homographic transformation. Many other homographic transformations are possible, including transforming from one perspective view to another perspective view, transforming from one planar view to another planar view, and transforming from a planar view to a perspective view, among many others.

A homographic transformation can be used when calibrating a camera as an aid in determining whether estimated extrinsic parameters are close to accurate. In camera calibration, a video content analysis system is seeking values for the rotational angles, $\alpha$, $\beta$, and $\gamma$ of the camera, as well as a translation vector, $[X_T, Y_T, Z_T]$, for the camera. Since the camera is assumed to be stationary, $X_T$ is assumed to be zero, and thus only five parameters need to be determined. In various implementations, the video content analysis system can test estimated extrinsic parameters, including applying a homographic transformation to map 2-D coordinates in the image plane to 3-D points in the real world.

Figure 10:
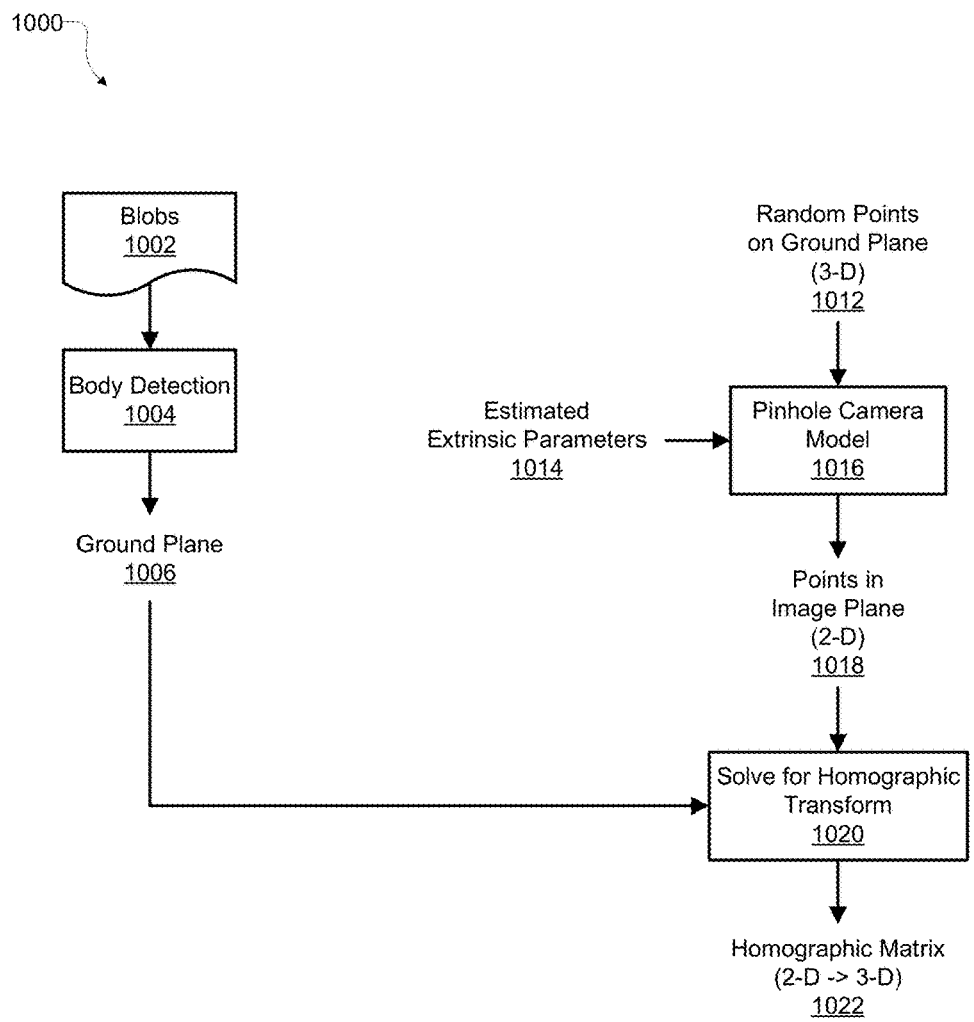
FIG. 10 illustrates an example of a process where a homographic matrix can be determined, which can be used to determine the correctness of estimated extrinsic parameters.

FIG. 10 illustrates an example of a process 1000 where a homographic matrix can be determined, which can be used to determine the correctness of estimated extrinsic parameters. The example process 1000 can be executed by a video content analysis system, or more specifically an automated scene calibration system included in a video content analysis system.

In various implementations, the system can obtain blobs 1002 from a video frame. The system can then apply body detection 1004 methods to identify blobs associated with people, and to locate the position of the people's feet. Locating the people's feet can include using full body detection, upper-body detection, or facial detection, or a combination of all three methods. The system can then use the location of people's feet to estimate the location of the ground plane 1006 in the scene, as discussed above.

Next, the video content analysis system can select random, 3-D real-world points 912 relative to the ground plane. Specifically, the system can select a set of n points whose coordinates are $(X_i, Y_i, 0)$ for i=0, 1, 2 ... n−1. The Z coordinate for this set of n points is zero in each case because the point is assumed to be on the ground. The values of X and Y coordinates can be random, since any value of X and Y is likely to fall on somewhere on the ground plane. Thus, for example, X and Y can be outside the frame.

The video content analysis system can also select estimated extrinsic parameters 1014. In various implementations, the estimated extrinsic parameters 1014 may be entirely random, or may be selected based on reasonable assumptions, or may be selected based on previously tested extrinsic parameters. For example, as discussed further below, the extrinsic parameters 1014 can be offset from previously tested extrinsic parameters that had a low cost value.

The video content analysis system can next map each of the 3-D random points on the ground plane 1012 to 2-D points in the image plane 1018 using the pinhole camera model 1016. In this mapping, the estimated extrinsic parameters 1014 are input into the pinhole camera model 1016. The 2-D coordinates $p_i=(x_i, y_i)$, where i=0, 1, 2, ... n−1, for each of the 3-D random points on the ground plane 1012, can be determined using the following equation:

$$p_i \begin{bmatrix} x_i \\ y_i \\ 1 \end{bmatrix} = \begin{bmatrix} f_x & s & x_c & 0 \\ 0 & f_y & y_c & 0 \\ 0 & 0 & 1 & 0 \end{bmatrix} \begin{bmatrix} R & T \\ 0 & 1 \end{bmatrix} \begin{bmatrix} X_i \\ Y_i \\ Z_i \\ 1 \end{bmatrix}$$

The above equation includes the camera matrix, which includes virtual intrinsic parameters, and the estimated rotational, R, and translation, T, parameters. The resulting two-dimensional coordinates $p_i=(x_i, y_i)$ represent supposed points in the ground plane, as the ground plane is represented in the video fame.

The video content analysis system may next solve for a homographic transform 1020. That is, the system can compute a homographic matrix 1022 that the system can use to map 2-D coordinates on ground plane 1006 to 3-D real-world coordinates. Stated another way, the system can determine a homographic matrix 1022 that provides a transformation from (possibly) perspective view of the ground or floor in the video image to a planar view that can represent the real world. An example homographic matrix 1022 can be given as follows:

$$H = \begin{bmatrix} h_{11} & h_{12} & h_{13} \\ h_{21} & h_{22} & h_{23} \\ h_{31} & h_{32} & 1 \end{bmatrix}$$

The homographic transformation for each 2-D coordinate $p_i$ to 3-D real world point $W_i=(X_i, Y_i)$ can be determined using the following equation:

$$W_i \begin{bmatrix} X_i \\ Y_i \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x_i \\ y_i \\ 1 \end{bmatrix}$$

The example homographic matrix 1022 includes eight variables, which can be solved, for example, using four random points on the ground plane 1012. Each point on the ground plane includes a horizontal coordinate and a vertical coordinate, which can each be solved with a separate equation. Four random points thus can be used to provide eight equations, which can be solved, linearly, to provide the eight variables. Using more than four random points can provide a more accurate solution, but generally four random points are sufficient.

The resulting homographic matrix 1022 can then be used to map any 2-D coordinate on the ground plane of the image to 3-D real-world points. The video content analysis system can thus use the homographic matrix 1022 to test the accuracy of the estimated extrinsic parameters 1014.

Figure 11:
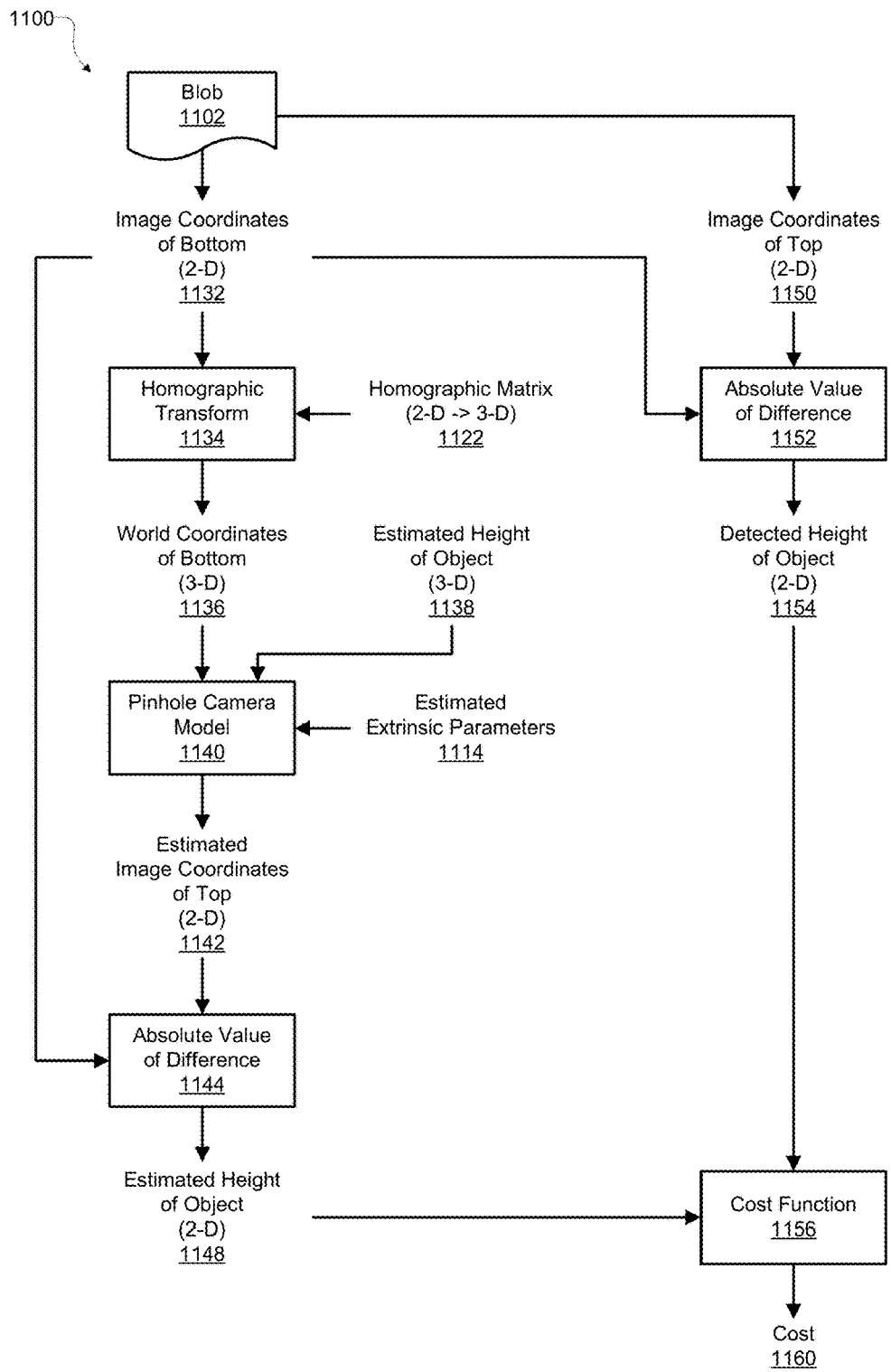
FIG. 11 illustrates an example process for determining a cost value for estimated extrinsic parameters.

FIG. 11 illustrates an example process 1100 for determining a cost value for estimated extrinsic parameters 1114. The process 1100 can be executed by a video content analysis system, or, more specifically, by an automated scene calibration system included in a video content analysis system.

The system may first obtain a blob 1102 from a video frame, where the blob 1102 has been identified as associated with a person moving around in the scene. The system may next obtain the 2-D image coordinates $(x_b, y_b)$ of the bottom 1132 of the blob 1102. For example, the system may examine a bounding box for the blob 1102, and use the horizontal and vertical coordinates, within the video frame, of the bottom of the bounding box for the image coordinates $(x_b, y_b)$ of the bottom 1132 of the blob 1102.

The video content analysis system may next apply a homographic transform 1134 to the image coordinates $(x_b, y_b)$ of the bottom 1132 of the blob 1102, using a homographic matrix 1122 determined as in the process 1000 of FIG. 10. The homographic transform 1134 in FIG. 11 can produce 3-D real-world coordinates $(X_b, Y_b)$, of the bottom 1136 (that is, the location of the feet) of the person that is associated with the blob 1102. Because these real-world coordinates $(X_b, Y_b)$ are supposedly on the ground or floor, the Z component can be assumed to be zero. Since the homographic matrix 1122 was based on the estimated extrinsic parameters 1114, these real-world coordinates $(X_b, Y_b)$ are approximations.

The video content system has so far made an estimation of where in the real world a person in the scene is standing. The system may next determine an estimated height of the object 1148 (that is, the person) in the scene, using the pinhole camera model 1140 and the estimated extrinsic parameters 1114. That is, the system estimates the two-dimensional height of the person within the video frame (e.g., in pixels, centimeters, inches, etc.). This estimated height 1148 can be compared against a detected height 1154, as discussed further below.

To determine the estimated height of the object 1148 within the video frame, the system can apply an estimated height of the object 1138 (that is, the person), in the real world. The estimated height of the person can be based on statistical averages. The estimated height of the object 1138—for example, 1.7 meters (5 feet, 6 inches)—can be added to the real-world coordinates $(X_b, Y_b)$ to determine the real-world coordinates $(X_t, Y_t)$, which represent the 3-D coordinates of top of the object. For example, the system can assume that $X_t = X_b$, $Y_t = Y_b$, and $Z_t$ equals the estimated height of the object 1138.

Having thus obtained real-world coordinates of the top of the object (or, person), the system can next transform these 3-D coordinates $(X_b, Y_b)$ to 2-D estimated image coordinates $(x_t, y_t)$ of the top of the object 1142, using the pinhole camera model 1140 and the estimated extrinsic parameters 1114. The following equation illustrates how the 2-D estimated image coordinates $(x_t, y_t)$ of the top of the object 1142 can be obtained:

$$p_t \begin{bmatrix} x_t \\ y_t \\ 1 \end{bmatrix} = \begin{bmatrix} f_x & s & x_c & 0 \\ 0 & f_y & y_c & 0 \\ 0 & 0 & 1 & 0 \end{bmatrix} \begin{bmatrix} R & T \\ 0 & 1 \end{bmatrix} \begin{bmatrix} X_b \\ Y_b \\ Z_t \\ 1 \end{bmatrix}$$

The system then has 2-D image coordinates $(x_b, y_b)$ for both the bottom of the blob 1102 and estimated coordinates $(x_t, y_t)$ for the top of the blob 1102. The system can then determine an estimated height of the object 1148, $H_{im}$, by taking an absolute value of the difference 1144 of the vertical coordinates, as expressed by the following equation:

$$H_{im} = |y_t - y_b|$$

The estimated height of the object 1148 can be expressed in pixels, centimeters, inches, or some other unit of measure.

The video content system can compare this estimated height $H_{im}$ of the object 1148 against a detected height $H'_{im}$ of the object 1154 to see how close the estimated extrinsic parameters 1114 are to reality. The detected height of the object 1154 is based on the blob 1102 itself, as detected in the video frame. Specifically, the system takes the coordinates of the top 1150 of the blob 1102 (e.g., from a bounding box associated with the blob), and determines absolute value of the difference 1152 between the top and bottom coordinates. The resulting detected height $H'_{im}$ of the object 1154 can be expressed in pixels, centimeters, inches, etc.

The system may next apply a cost function 1156 using both the estimated height $H_{im}$ of the object 1148 and the detected height $H'_{im}$ of the object to produce a cost value 1160 for the estimated extrinsic parameters 1114. The cost value 1160 indicates the suitability or accuracy of the particular estimated extrinsic parameters 1114.

In various implementations, the video content analysis system can apply the following cost function:

$$C_1 = (H_{im} - H'_{im}) \times (H_{im} - H'_{im})$$

Cost function $C_1$ provides cost value that is a measurement of the absolute difference between the estimated height $H_{im}$ and the detected height $H'_{im}$.

Alternatively or additionally, the system can use the following cost function:

$$C_2 = \frac{H_{im} - H'_{im}}{H'_{im}} \times \frac{H_{im} - H'_{im}}{H'_{im}}$$

Cost function $C_2$ provides a cost value that is a measurement of the relative difference between the estimated height $H_{im}$ and the detected height $H'_{im}$.

In various implementations, the video content analysis system can also consider the "pose" or orientation of the person relative to the video frame. The person may not be perfectly upright and/or the camera may be at an angle relative to what would be an upright position for the person. When the person being used to determine the cost value 1160 is not exactly upright, the estimated height $H_{im}$ and the detected height $H'_{im}$ can be close to each other, even though the estimated extrinsic parameters 1114 are far from correct. These estimated extrinsic parameters 1114 may be correct for other people in the scene, but the system is attempting to find extrinsic parameters for the majority of the people in the scene. Thus, in various implementations, the video content analysis system can additionally or alternatively use the following size-pose-based cost function $C_3$, which takes into account the estimated image coordinates of the top of the object 1142 and the detected image coordinates of the top of the object 1150:

$$C_3 = \begin{cases} (H_{im} - H'_{im}) \times (H_{im} - H'_{im}), & \frac{|x_t - x'_t|}{H_{im}} < T \\ \infty, & \frac{|x_t - x'_t|}{H_{im}} \geq T \end{cases}$$

In cost function $C_3$, when the absolute value of the difference between the estimated top coordinate, $x_t$, and the detected top coordinate, $x'_t$, is greater than or equal to a threshold T, the cost value is considered to be infinite. In other words, when the person is not upright and the estimated extrinsic parameters 1114 do not capture the person's pose, the estimated extrinsic parameters 1114 are essentially thrown out. When the absolute value of the difference between the estimated top coordinate $x_t$ and the detected top coordinate $x'_t$ is less than the threshold T, the cost value is a measurement of the absolute difference between the estimated height $H_{im}$ and the detected height $H'_{im}$, as provided by cost function $C_1$. The threshold thus can possibly accommodate cases where the pose or orientation of the object is skewed from vertical. The threshold can be set to, for example, 0.5 or 1 or some other suitable value.

The process 1100 of FIG. 11 can produce a cost value 1160 for one set of estimated extrinsic parameters, which, as discussed above, include three rotational variables and two translation variables. In various implementations, a video content analysis system can execute the process 1100 for many estimated extrinsic parameters to find a set of extrinsic parameters that have the lowest overall cost. The extrinsic parameters with the lowest cost may be the most suitable to use for a camera's calibration parameters.

Figure 12:
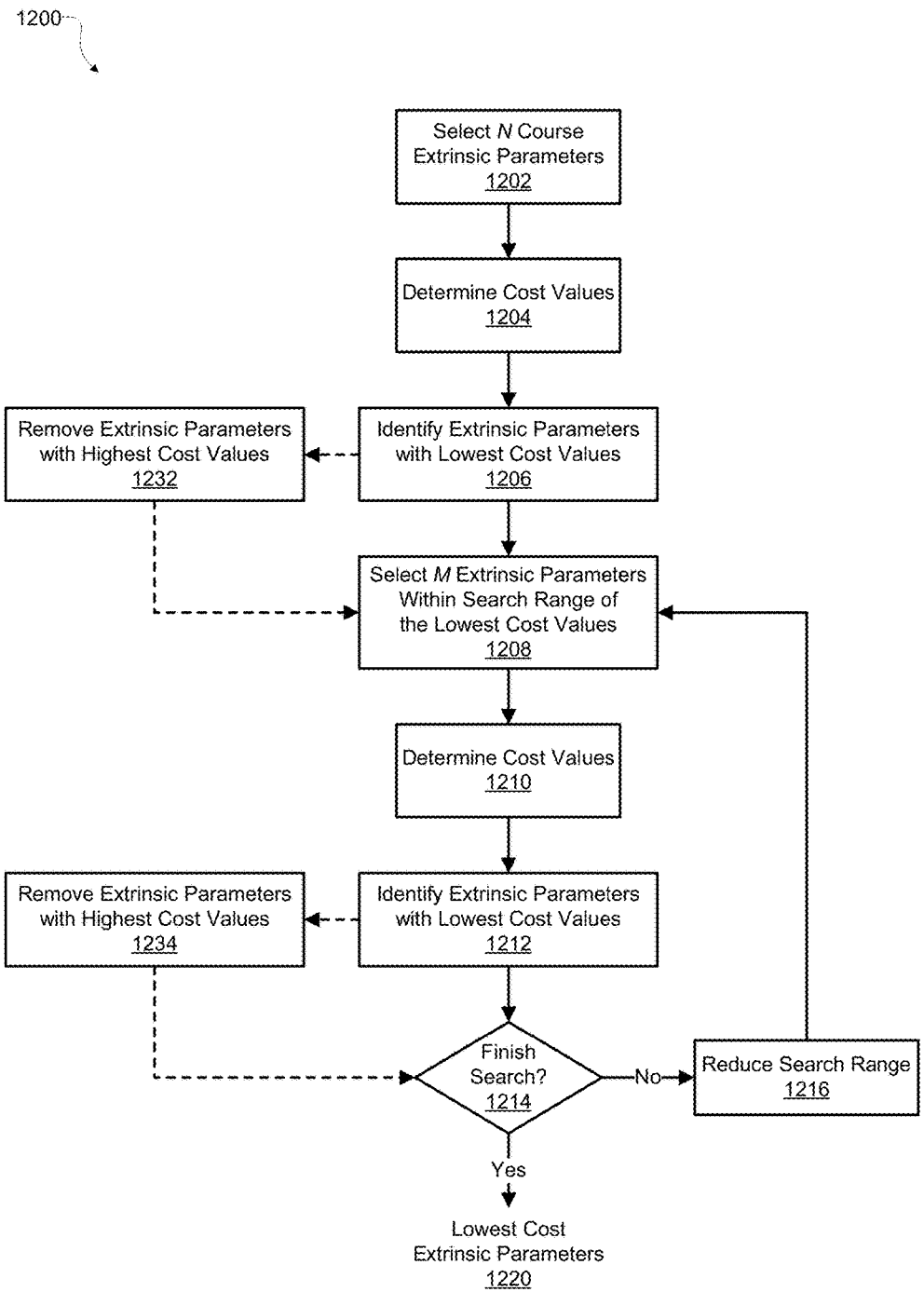
FIG. 12 illustrates an example of a process for searching for a set of extrinsic parameters that may have the lowest cost for a given camera, viewing a particular scene.

FIG. 12 illustrates an example of a process 1200 for searching for a set of extrinsic parameters that may have the lowest cost for a given camera, viewing a particular scene. The process 1200 can be executed by a video content analysis system, or more particularly by an automated scene calibration system included in a video content analysis system. The process 1200 can be applied to searching a grid of points for the lowest value. There are at least five parameters in the extrinsic parameters, hence the search space is a five-dimensional space, with one set of extrinsic parameters to provide a point in the five-dimensional space.

The system may first, at step 1202, select a number sets of extrinsic parameters, N. These N extrinsic parameter sets may be coarse, or randomly spread across the possible values. At step 1204, the system may next determine a cost value for each of the N extrinsic parameter sets. To determine the cost values, the system can use the processes illustrated in FIG. 10 and FIG. 11. In various implementations, in FIG. 12, the system can apply the N extrinsic parameters to multiple objects (typically, people) detected in the scene, and thus generate a cost value for each object. In this way, the system can determine an optimal set of extrinsic parameters that can correctly map as many objects as possible from the video frame to the real world.

At step 1206, the system can next identify the extrinsic parameters, from among the N extrinsic parameter sets, that had the lowest cost values. In some implementations, prior to proceeding to step 1208, the system may optionally, at step 1232, remove the extrinsic parameters with the highest cost values. For example, the extrinsic parameters that have the highest cost compared to their neighbors can be removed from consideration. Doing so may improve the efficiency of the process 1200 by reducing the number of extrinsic parameters considered each time the process 1200 looks for the lowest cost values. Step 1232 may be referred to as a non-maximum suppression method.

At step 1208, the system can select M additional extrinsic parameter sets, where the M extrinsic parameter sets are within a search range of the extrinsic parameters that had the lowest cost values. The search range can be defined in terms of rotational angels and translation distances. For example, the search range can be initially set to 10 degrees of rotation and 10 meters of translation. Thus, for example, for an extrinsic parameter set (identified at step 1206 as having a lowest cost value) with rotational angles [10, 5, 0] and translation vector [7, 20, 0], at step 1208 the system can select one new extrinsic parameter set with rotational angles [10, 15, 10] and translation vectors [17, 30, 0] and another new extrinsic parameter set with rotational angles [0, −5, −10] and translation vectors [−3, 10, 0]. Note that, as illustrated in this example, negative rotational angles and translation vectors may be possible, for example because the reference system is centered at the camera center.

At step 1210, the system can next determine cost values for the M extrinsic parameters selected in step 1208. The system can use the processes illustrated in FIG. 10 and FIG. 11. At step 1212 of FIG. 12, the system can again identify the extrinsic parameters with the lowest cost values. In various implementations, this determination can include the cost values for both the N initial extrinsic parameters selected at step 1202, and the M extrinsic parameters selected at step 1208. In various implementations, the determination at step 1212 can include only the cost values for only the M extrinsic parameters.

In various implementations, before proceeding to step 1214, the system may optionally, at step 1234, remove the extrinsic parameters that have the highest cost values. Doing so may improve the efficiency of the process 1200 by reducing the number of extrinsic parameters considered each time the process 1200 looks for the lowest cost values.

At step 1214, the system next can determine whether to finish the searching. The system may finish searching, for example, when the search range is below a certain set of values. Alternatively or additionally, the system may complete the search based on a RANSAC analysis, discussed below.

When the system determines that the search should not yet be finished, the system can, at step 1216, reduce the search range. For example, in some implementations, the system may reduce the search range by 1.2 times (e.g., using the above example, from 10 degrees to 8.33 degrees and 10 meters to 8.33 meters) or by half, or by some other factor. The system can then return to step 1208. At step 1208, the system can select a new set of extrinsic parameters that are within the search range of the extrinsic parameters identified at step 1212. At step 1210, the system can determine cost values for these new extrinsic parameters. At step 1212, the system can again identify the extrinsic parameters with the lowest cost values.

At step 1214, when the system determines that the search is finished, the system can output the lowest cost extrinsic parameters 1220. As noted above, the lowest cost extrinsic parameters 1220 can be based on cost values generated for using many objects in the scene, and not just for one object. The lowest extrinsic parameters 1220 thus can reflect the most optimal extrinsic parameters, applicable across the majority of the scene.

In some cases, the extrinsic parameter estimation may be affected by the accuracy of the object detection. In these cases, the RANSAC approach can be implemented to improve the robustness of the estimation. RANSAC is a resampling technique that generates candidate solutions using a minimum number of data points required to estimate a model's parameters. In contrast, other sampling techniques use as much data as possible, and then remove "outliers," or data points that are outside of an acceptable range. Data points that are within the acceptable range are referred to as "inliers." For a given dataset, RANSAC uses a voting scheme to find an optimally fitting result. Data elements in the dataset are used to vote for one or multiple models. The implementation of this voting scheme is based on two assumptions: that the noisy features will not vote consistently for any single model (few outliers) and there are enough features to agree on a good model (few missing data).

A RANSAC algorithm generally involves at least two steps, which can be iteratively repeated: in the first step, a sample subset containing minimal data items is randomly selected from the input dataset. A fitting model and the corresponding model parameters are computed using only the elements of this sample subset. The cardinality of the sample subset is the smallest sufficient to determine the model parameters. In the second step, the algorithm checks which elements of the entire dataset are consistent with the model instantiated by the estimated model parameters obtained from the first step. A data element will be considered as an outlier if it does not fit the fitting model instantiated by the set of estimated model parameters within some error threshold that defines the maximum deviation attributable to the effect of noise.

In various implementations, a video content analysis system can use a RANSAC strategy as described above to randomly select a set of objects from the objects detected in the scene and estimate extrinsic parameters using this set of objects. The system can then apply the extrinsic parameters to all the objects to see how many objects are inliers. The system can then identify the extrinsic parameters with most inliers, which can then be used as the final extrinsic parameters.

Figure 13A:
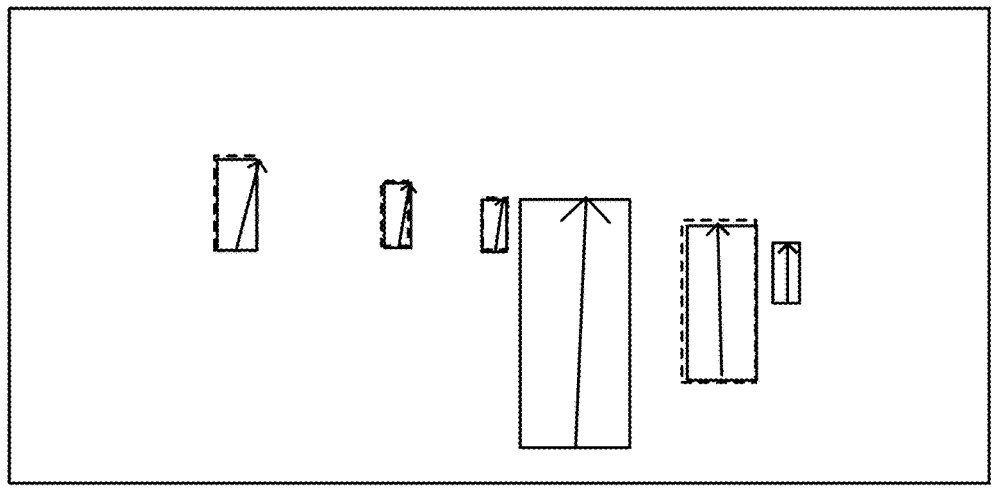
FIG. 13A and FIG. 13B illustrate examples of video frames where estimated extrinsic parameters were applied to estimate the height of objects in a scene.
Figure 13B:
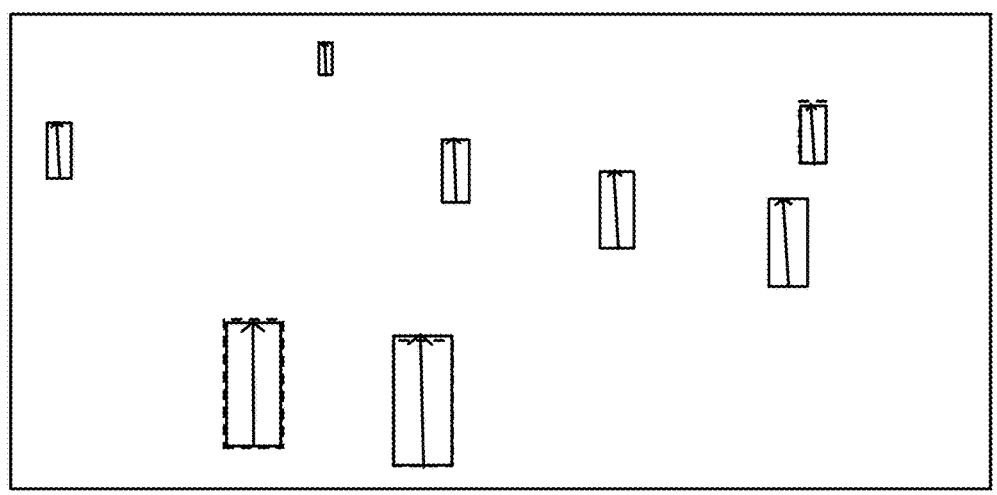

FIG. 13A and FIG. 13B illustrate examples of video frames where estimated extrinsic parameters, determined as discussed above, were applied to estimate the height of objects in a scene. In these examples, a video content analysis system determined a number of bounding boxes, shown with dashed lines, for various blobs detected in a video frame. These blobs may include people or other moving objects. The system also generated boxes, shown with solid lines, using estimated extrinsic parameters. In a video content analysis system, the boxes in solid lines can be associated with information such as the real-world height of the objects (e.g., 1.5 meters or 4 feet, 11 inches), as well as the real world location of the objects (e.g., three feet in front of the camera and one foot to the right of the camera). The arrows in these examples indicate the estimated locations of the top and bottom of the objects, including a lean angle of the object, if any. In FIG. 13A, in particular, objects one area of the frame have a noticeable lean, possibly due to the angle of the camera with respect to these objects.

As illustrated in these examples, the estimated extrinsic parameters produce very good estimations of the height and location of the objects. For the majority of the objects in both FIGS. 13A and 13B, the estimated height and location of the object are accurate to the point of obscuring the bounding boxes. In the cases where the bounding boxes are not obscured, the boxes in solid lines are nearly the same as the bounding boxes. Additionally, the estimated height and location of the objects match even when the objects had a noticeable lean away from vertical.

Figure 14A:
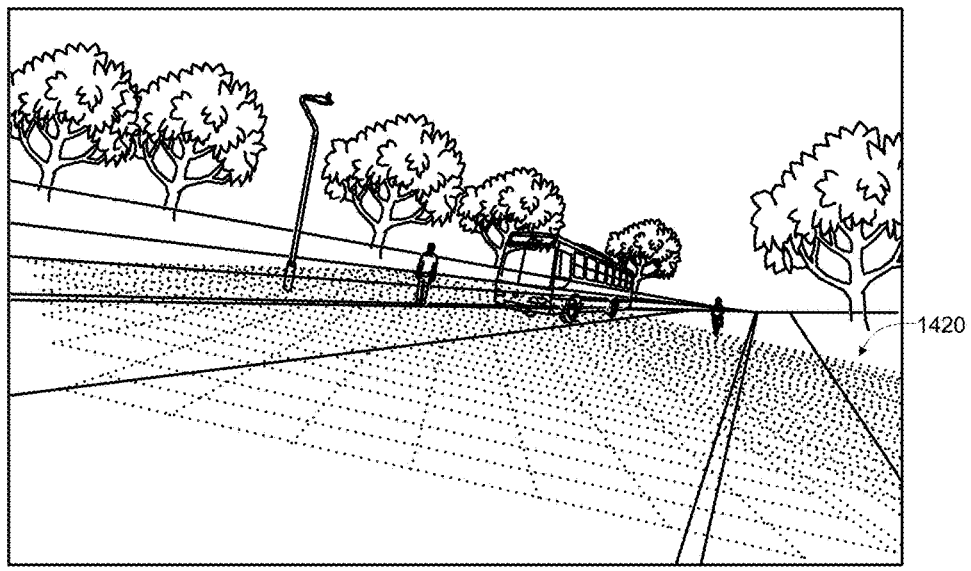
FIG. 14A and FIG. 14B illustrate examples of two scenes onto which estimated ground planes have been projected.
Figure 14B:
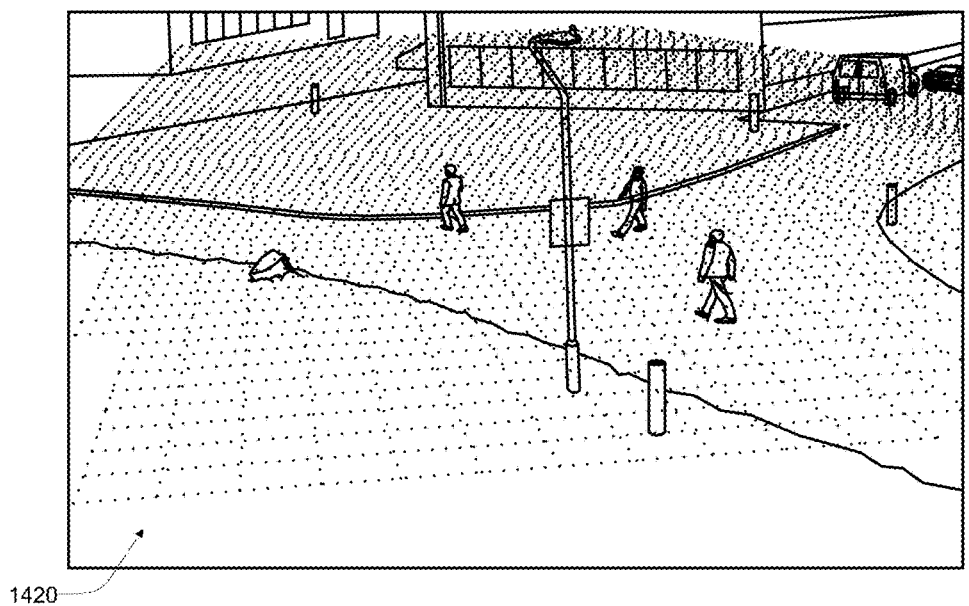

FIG. 14A and FIG. 14B illustrate examples of two scenes onto which estimated ground planes 1420 have been projected. The example of FIG. 14A corresponds to the scene illustrated in FIG. 13A, and the example of FIG. 14B corresponds to the scene illustrated in FIG. 13B. In FIG. 14A and FIG. 14B, the estimated ground planes 1420 have been determined using estimated extrinsic parameters, determined as discussed above. As illustrated in these examples, the estimated ground plane 1420 reflects very closely the ground plane that can be identified by an average human eye. In FIG. 14A, the estimated ground plane 1420 reflects the low position and tilted angle of the camera. In FIG. 14B, the estimated ground plane 1420 reflects the high location of the camera.

Figure 15:
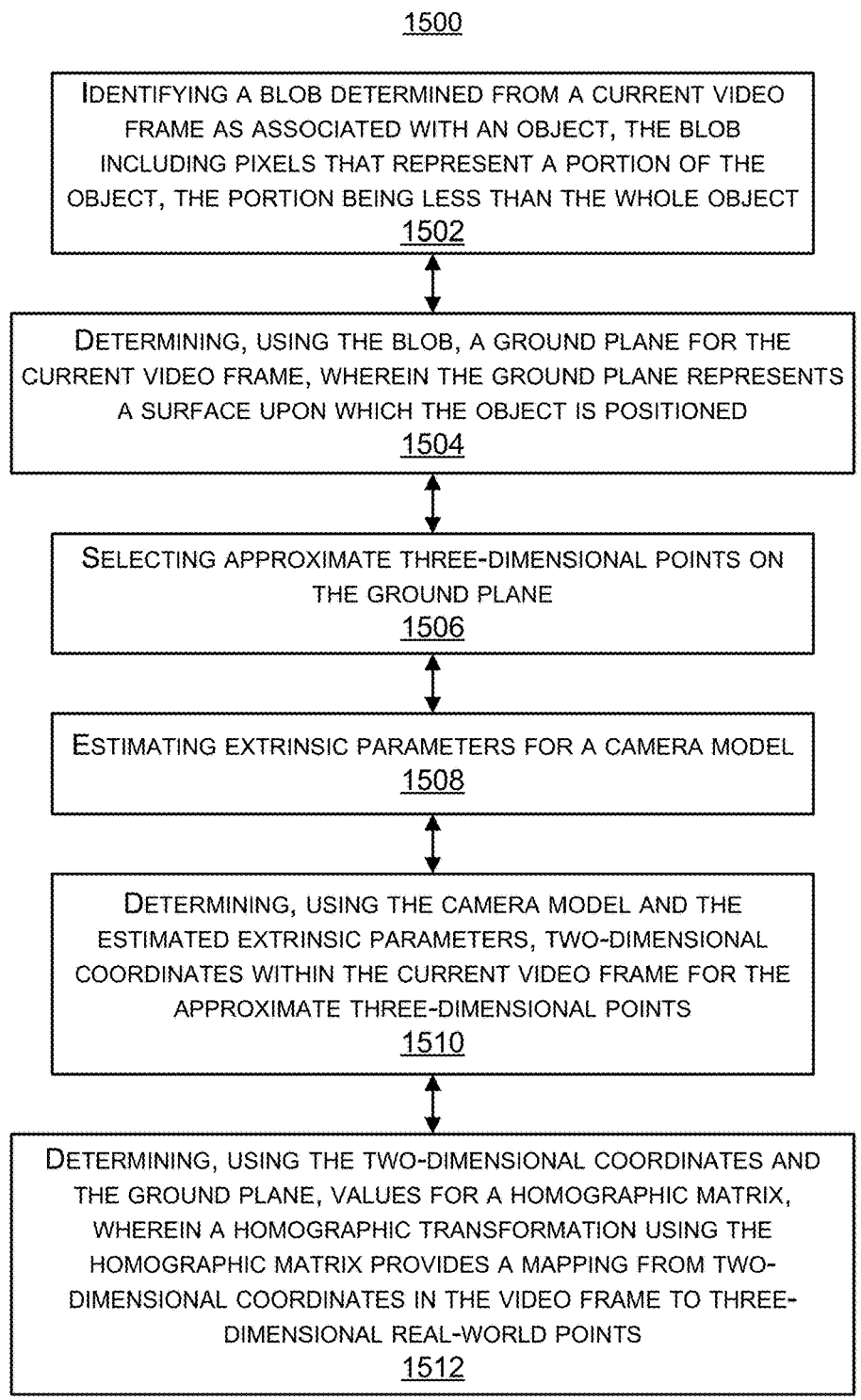
FIG. 15 illustrates an example of a process of automated scene calibration.

FIG. 15 illustrates an example of a process 1500 automated scene calibration, which can be used by a video content analysis system to automatically calibrate a camera for a particular scene being viewed by the camera. At 1502, the process 1500 includes identifying a blob determined from a current video frame as associated with an object, the blob including pixels that represent a portion of the object, the portion being less than the whole object, the portion of being less than the whole object. In various implementations, a video content analysis system can identify moving objects in a video frame using background subtraction, morphology operations, connected component analysis, and blob processing. The moving objects can be identified as a blob of pixels. In some cases, only a portion of the object is within the video frame. For example, when the pixels in a blob represent a person, only the persons upper body or face may be within the video frame.

At 1504, the process 1500 includes determining, using the blob, a ground plane for the current video frame, wherein the ground place represents a surface upon which the object is positioned. The ground plane is a planar surface in the real world, such as a floor in a room or the ground in an outdoor scene. In various implementations, a video content analysis system can use one or more blobs identified in a scene to determine the ground plane in a video frame. When the object is only partially within the video frame, in various implementations, the video content analysis system can extrapolate the location of the bottom of the object, and use this information to determine the ground plane. For example, when the object is a person and at least the person's upper body is within the video frame, the video content analysis system can use an estimated height of a person to determine where the person's feet are. As another example, when at least the person's face is in the video frame, the video content analysis system can use an estimated distance between the person's eyes to determine where the person's feet are. In these examples, the location of the person's feet can be used to estimate the location within the video frame of the ground plane.

At 1506, the process 1500 includes selecting approximate three-dimensional points on the ground plane. The approximate three-dimensional points are real-world points that are assumed to be on the ground; that is, the height or Z coordinate of the three-dimensional points is zero.

At 1508, the process 1500 includes estimating extrinsic parameters for a camera model. The extrinsic parameters can include rotational and translation parameters. In various implementations, the camera is assumed to be stationary, such that X translation parameter can be treated as zero. In these implementations, only five extrinsic parameters need to be determined. In various implementations, the extrinsic parameters can be selected randomly, can be selected based on reasonable assumptions, or can be selected based on previously tested extrinsic parameters.

At 1510, the process 1500 includes determining, using the camera model and the estimated extrinsic parameters, two-dimensional coordinates within the current video frame for the approximate three-dimensional points. In various implementations the estimated extrinsic parameters from step 1508 can be input into a camera model, such as a pinhole camera model. The camera model can then be used to map the approximate three-dimensional points selected in step 1506 to two-dimensional coordinates in the video frame.

At 1512, the process 1500 includes determining, using the two-dimensional coordinates and the ground plane, values for a homographic matrix, wherein a homographic transformation using the homographic matrix provides a mapping from two-dimensional coordinates in the video frame to three dimensional real-world points. A homographic transform is a method for transforming from one reference system to another. Homographic transformation methods can be used, for example, to scale, rotate, translate, skew, or de-skew an image. The homographic matrix determined at step 1512 can be used to transform a two-dimensional coordinate in a video frame to a corresponding three-dimensional point in the real world. In various implementations, the homographic matrix includes eight variables, which can be solved using at least four approximate three-dimensional points on the ground plane. The homographic matrix can further be used to determine a cost for the estimated extrinsic parameters.

In some examples, the process 1500 may be performed by a computing device or an apparatus, such as the video analytics system 100. For example, the process 1500 can be performed by the video analytics system 100 and/or the object tracking engine 106 shown in FIG. 1. In some cases, the computing device or apparatus may include a processor, microprocessor, microcomputer, or other component of a device that is configured to carry out the steps of process 1500. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1500 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The content-adaptive blob tracking operations discussed herein may be implemented using compressed video or using uncompressed video frames (before or after compression). An example video encoding and decoding system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to the destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, the system may be configured to support one-way or two-way video transmission to support applications such as video streaming, video playback, video broadcasting, and/or video telephony.

In one example, the source device includes a video source, a video encoder, and a output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, the source device and the destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:
1. A method for automated scene calibration, comprising:
determining a blob from a current video frame;
identifying the blob as associated with an object, the blob including pixels that represent at least a portion of the object;

determining, using the blob, a ground plane for the current video frame, wherein the ground plane represents a surface upon which the object is positioned;

selecting approximate three-dimensional points on the ground plane;

estimating extrinsic parameters for a camera model;

determining, using the camera model and the estimated extrinsic parameters, two-dimensional coordinates within the current video frame that correspond to the approximate three-dimensional points; and determining, using the two-dimensional coordinates and the ground plane, values for a homographic matrix, wherein a homographic transformation using the values for the homographic matrix provides a mapping from the two-dimensional coordinates in the current video frame to three-dimensional real-world points.

2. The method of claim 1, wherein determining the two-dimensional coordinates includes using virtual intrinsic parameters, wherein the virtual intrinsic parameters include at least a focal length and an optical center.

3. The method of claim 1, wherein at least the portion of the object is less than a whole of the object, wherein the object includes a person, wherein the pixels included in the blob include at least an upper body of the person, and wherein determining the ground plane includes using an estimated height of the person to locate an approximate position of one or both feet of the person.

4. The method of claim 1, wherein at least the portion of the object is less than a whole of the object, wherein the object includes a person, wherein the pixels included in the blob include at least a face of the person, and wherein determining the ground plane includes using an estimated distance between eyes of the person and an estimated height of the person to locate an approximate position of one or both feet of the person.

5. The method of claim 1, further comprising:
using random sample consensus to modify the estimated extrinsic parameters.

6. The method of claim 1, further comprising:
determining, using a cost function, a cost value for the estimated extrinsic parameters, wherein determining the cost value includes:
determining an estimated height of an object in the current video frame using the estimated extrinsic parameters;
determining a detected height of the object using coordinates of the object within the current video frame; and
comparing the estimated height and the detected height using the cost function.

7. The method of claim 6, wherein determining the estimated height includes:
determining, using the homographic matrix, a three-dimensional point for two-dimensional coordinates of a bottom the object, wherein the two-dimensional coordinates are within the current video frame; and
determining two-dimensional coordinates of a top of the object using the camera model and an estimated real-world height of the object.

8. The method of claim 6, further comprising:
determining a plurality cost values for a plurality of extrinsic parameters, the plurality of cost values including the cost value; and
identifying from the plurality of cost values a set of extrinsic parameters with a lowest cost value.

9. The method of claim 6, wherein the cost function is a size-pose-based cost function.

10. An apparatus, comprising:
a memory configured to store video data; and
a processor configured to:
determine a blob from a current video frame;
identify the blob as associated with an object, the blob including pixels that represent at least a portion of the object;
determine, using the blob, a ground plane for the current video frame, wherein the ground plane represents a surface upon which the object is positioned;
select approximate three-dimensional points on the ground plane;
estimate extrinsic parameters for a camera model;
determine, using the camera model and the estimated extrinsic parameters, two-dimensional coordinates within the current video frame that correspond to the approximate three-dimensional points; and
determine, using the two-dimensional coordinates and the ground plane, values for a homographic matrix, wherein a homographic transformation using the values for the homographic matrix provides a mapping from the two-dimensional coordinates in the current video frame to three-dimensional real-world points.

11. The apparatus of claim 10, wherein the camera model provides a mapping from three-dimensional real-world points to two-dimensional coordinates in the current video frame.

12. The apparatus of claim 10, wherein homographic transformation provides a mapping from one coordinate system to another coordinate system.

13. The apparatus of claim 10, wherein extrinsic parameters include at least three rotational parameters and two translational parameters.

14. The apparatus of claim 10, wherein the processor is configured to determine the two-dimensional coordinates using virtual intrinsic parameters, wherein the virtual intrinsic parameters include at least a focal length and an optical center.

15. The apparatus of claim 10, wherein at least the portion of the object is less than a whole of the object, wherein the object includes a person, wherein the pixels included in the blob include at least an upper body of the person, and wherein the processor is configured to determine the ground plane using an estimated height of the person to locate an approximate position of one or both feet of the person.

16. The apparatus of claim 10, wherein at least the portion of the object is less than a whole of the object, wherein the object includes a person, wherein the pixels included in the blob include at least a face of the person, and wherein the processor is configured to determine the ground plane using an estimated distance between eyes of the person and an estimated height of the person to locate an approximate position of one or both feet of the person.

17. The apparatus of claim 10, wherein the processor is further configured to:
use random sample consensus to modify the estimated extrinsic parameters.

18. The apparatus of claim 10, wherein the processor is further configured to:
determine, using a cost function, a cost value for the estimated extrinsic parameters, wherein determining the cost value includes:
determining an estimated height of an object in the current video frame using the estimated extrinsic parameters;
determining a detected height of the object using coordinates of the object within the current video frame; and comparing the estimated height and the detected height using the cost function.

19. The apparatus of claim 18, wherein the processor is configured to determine the estimated height by:
    determining, using the homographic matrix, a three-dimensional point for two-dimensional coordinates of a bottom the object, wherein the two-dimensional coordinates are within the current video frame; and
    determining two-dimensional coordinates of a top of the object using the camera model and an estimated real-world height of the object.

20. The apparatus of claim 18, wherein the processor is further configured to:
    determine a plurality cost values for a plurality of extrinsic parameters, the plurality of cost values including the cost value; and
    identify from the plurality of cost values a set of extrinsic parameters with a lowest cost value.

21. The apparatus of claim 18, wherein the cost function is a size-pose-based cost function.

22. The apparatus of claim 10, wherein the processor is further configured to:
    using the estimated extrinsic parameters for tracking objects in a video.

23. A non-transitory computer-readable medium having stored thereon instructions that, when executed by one or more processors, cause the one or more processors to:
    determine a blob from a current video frame;
    identify the blob as associated with an object, the blob including pixels that represent at least a portion of the object;
    determine, using the blob, a ground plane for the current video frame, wherein the ground plane represents a surface upon which the object is positioned;
    select approximate three-dimensional points on the ground plane;
    estimate extrinsic parameters for a camera model;
    determine, using the camera model and the estimated extrinsic parameters, two-dimensional coordinates within the current video frame that correspond to the approximate three-dimensional points s; and
    determine, using the two-dimensional coordinates and the ground plane, values for a homographic matrix, wherein a homographic transformation using the values for the homographic matrix provides a mapping from the two-dimensional coordinates in the current video frame to three-dimensional real-world points.

24. The non-transitory computer-readable medium of claim 23, wherein determining the two-dimensional coordinates includes using virtual intrinsic parameters, wherein the virtual intrinsic parameters include at least a focal length and an optical center.

25. The non-transitory computer-readable medium of claim 23, wherein at least the portion of the object is less than a whole of the object, wherein the object includes a person, wherein the pixels included in the blob include at least an upper body of the person, and wherein determining the ground plane includes using an estimated height of the person to locate an approximate position of one or both feet of the person.

26. The non-transitory computer-readable medium of claim 23, wherein at least the portion of the object is less than a whole of the object, wherein the object includes a person, wherein the pixels included in the blob include at least a face of the person, and wherein determining the ground plane includes using an estimated distance between eyes of the person and an estimated height of the person to locate an approximate position of one or both feet of the person.

27. The non-transitory computer-readable medium of claim 23, further comprising instructions that, when executed by the one or more processors, cause the one or more processors to:
    determine, using a cost function, a cost value for the estimated extrinsic parameters, wherein determining the cost value includes:
    determine an estimated height of an object in the current video frame using the estimated extrinsic parameters;
    determine a detected height of the object using coordinates of the object within the current video frame; and
    compare the estimated height and the detected height using the cost function.

28. The non-transitory computer-readable medium of claim 27, wherein determining the estimated height includes:
    determining, using the homographic matrix, a three-dimensional point for two-dimensional coordinates of a bottom the object, wherein the two-dimensional coordinates are within the current video frame; and
    determining two-dimensional coordinates of a top of the object using the camera model and an estimated real-world height of the object.

29. The method of claim 1, wherein the extrinsic parameters include one or more of a translation and a rotation of a camera.

30. The method of claim 1, wherein the homographic matrix is used for testing accuracies of one or more sets of extrinsic parameters.

* * * * *